United States Patent
Nakamura

(10) Patent No.: US 8,351,459 B2
(45) Date of Patent: Jan. 8, 2013

(54) COMMUNICATION NODE, AND TOKEN ISSUING METHOD AND TOKEN-RING COMMUNICATION METHOD IN RING COMMUNICATION SYSTEM

(75) Inventor: Masato Nakamura, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 187 days.

(21) Appl. No.: 12/297,830

(22) PCT Filed: Jun. 26, 2006

(86) PCT No.: PCT/JP2006/312743
§ 371 (c)(1),
(2), (4) Date: Oct. 20, 2008

(87) PCT Pub. No.: WO2008/001420
PCT Pub. Date: Jan. 3, 2008

(65) Prior Publication Data
US 2009/0097419 A1    Apr. 16, 2009

(51) Int. Cl.
*H04L 12/433* (2006.01)
*H04L 12/437* (2006.01)
(52) U.S. Cl. .............. 370/452; 370/258; 709/251
(58) Field of Classification Search ............... None
See application file for complete search history.

(56) References Cited

U.S. PATENT DOCUMENTS

| | | | |
|---|---|---|---|
| 5,155,725 A * | 10/1992 | Khalil | 370/455 |
| 5,388,097 A | 2/1995 | Baugher et al. | |
| 5,999,541 A | 12/1999 | Hinchey et al. | |
| 6,108,346 A * | 8/2000 | Doucette et al. | 370/450 |
| 6,704,318 B1 | 3/2004 | Stuart et al. | |
| 7,277,910 B1 * | 10/2007 | Anubolu et al. | 709/200 |

FOREIGN PATENT DOCUMENTS

| | | |
|---|---|---|
| JP | 58-111454 A | 7/1983 |
| JP | 61-125253 A | 6/1986 |

(Continued)

OTHER PUBLICATIONS

IEEE std 802.5-1998E, "Information technology—Telecommunications and information exchange between systems—Local and metropolitan area network—Specific requirements-Part 5: Token ring access method and physical layer specifications," 1998, pp. 20, 48-49.*

(Continued)

*Primary Examiner* — John Pezzlo
*Assistant Examiner* — Matthew Campbell
(74) *Attorney, Agent, or Firm* — Sughrue Mion, PLLC

(57) ABSTRACT

A communication node includes a token-start-right acquisition processor that issues a token-start-right acquisition frame containing specific information, determines a priority based on predetermined reference using specific information for other communication node and the specific information for the own communication node upon reception of a token-start-right acquisition frame from the other communication node, issues the token-start-right acquisition frame at a predetermined time interval when the own communication node has a higher priority than the other communication node, and stops issuing the token-start-right acquisition frame when the own communication node has a lower priority than the other communication node, to forward the token-start-right acquisition frame of the other communication node, and also includes a token start processor that passes the token frame to the ring upon reception of the token-start-right acquisition frame which is issued by the token-start-right acquisition processor and circulates around the ring.

4 Claims, 33 Drawing Sheets

FOREIGN PATENT DOCUMENTS

| | | |
|---|---|---|
| JP | 63-215241 A | 9/1988 |
| JP | 03-172041 A | 7/1991 |
| JP | 05-110578 A | 4/1993 |
| JP | HEI 10-084376 A | 3/1998 |
| JP | 2002-523992 A | 7/2002 |
| JP | 2002-330146 A | 11/2002 |
| JP | 2004-096159 A | 3/2004 |
| JP | 2005-079997 A | 3/2005 |
| JP | 2006-094306 A | 4/2006 |
| KR | 10-0433761 B1 | 7/2003 |
| KR | 2003-0062473 A | 7/2003 |

OTHER PUBLICATIONS

Yoshinobu Kato, "Ethernet Shintenchi ni Idomu", Nikkei Communications, No. 353, Nikkei Business Publications, Inc., Nov. 5, 2001, pp. 97-98.

Karl F. Pieper et al., "Details of FDDI Technology-Construction of 100 Mbps LAN-", Aug. 30, 1993, pp. 67-73.

Alejandra Zapata et al.; Next-Generation 100-Gigabit Metro Ethernet (100 GbME) Using Multiwavelength Optical Rings; Jounal of Lightwave Technology, vol. 22, No. 11, Nov. 2004 pp. 2421-2434.

"Information Technology—Telecommunications and Information Exchange between Systems—Local and Metropolitan Area Networks—Specific Requirements—Part 5: Token Ring Access Method and Physical Layer Specifications," ANSI/IEEE Std 802.5-1998E(R2003), Revision of ANSI/IEEE 802.5-1995, Adopted by ISO/IEC and redesignated as ISO/IEC 8802-5, 1995.

Japanese Office Action issued in corresponding Japanese Application No. 2010-045463 dated Feb. 14, 2012 (with translation) (3 pages).

Japanese Decision of a Patent Grant issued in corresponding Japanese Application No. 2010-045464 dated Feb. 14, 2012 (with translation) (2 pages)

* cited by examiner

COMMUNICATION NODE, AND TOKEN ISSUING METHOD AND TOKEN-RING COMMUNICATION METHOD IN RING COMMUNICATION SYSTEM

CROSS REFERENCE TO RELATED APPLICATION

This is a National Stage of Application No. PCT/JP2006/312743 filed Jun. 26, 2006, the contents of which is incorporated herein by reference in its entirety.

TECHNICAL FIELD

The present invention relates to a communication node used in an Ethernet (registered trademark)-base ring communication system communicating an Ethernet (registered trademark) in the shape of a ring, a token issuing method and a token-ring communication method in the ring communication system that allows masterless token ring communication in the communication system.

BACKGROUND ART

There is conventionally known a topology in which a network is constructed by connecting between communication terminals (hereinafter, "communication nodes") using FDDI (Fiber-Distributed Data Interface) (for example, Nonpatent literature 1). In the FDDI, generally, a network is constructed so that communication nodes are connected in a ring. The network using the FDDI is formed of a dual-loop structure having a first loop in which data is transmitted in a normal state, and a second loop which is configured so as to enable communication using a normal portion, when abnormality such as disconnection of a cable forming the first loop and failure in a communication node occurs, by performing loop-back so as to disconnect an abnormal portion from the network.

Further, the FDDI employs a token passing system that provides controls so that collisions of data transmitted between communication nodes connected to the network do not occur by using data for the right to transmit called a token. The token passing system is implemented in such a manner that a token is passed around the first loop, and a communication node wishing to transmit data takes the token, passes data instead that the communication node itself wishes to transmit, and releases the token again to the network when the transmission is finished, so that only one terminal can use the cable at a time.

Nonpatent literature 1: "Details of FDDI Technology-Construction of 100 Mbps LAN—"written by Karl F. Pieper, William J. Cronin Jr., and Wendy H. Michael, translated and supervised by Naoki Mizutame, first edition, published by Kyoritsu Shuppan Co., Aug. 30, 1993, p. 67 to 73.

Disclosure of Invention

Problem to be Solved by the Invention

Currently, however, a configuration in which a network is constructed by connecting between communication nodes using Ethernet (registered trademark) is widely used. The Ethernet (registered trademark) employs a CSMA/CD (Carrier Sense Multiple Access/Collision Detection) system that gets communication right while avoiding collisions, when the communication node connected to the Ethernet (registered trademark) transmits data, and propagates the data to all the connected communication nodes. To function the system, a connection configuration of the communication nodes in the Ethernet (registered trademark) includes two topologies such as a bus topology constructed by extending branch cables, from one cable which is a mainline, provided at appropriate intervals to arrange a plurality of communication nodes thereat, and a star topology constructed by radially arranging a plurality of communication nodes around one control unit (hub).

However, the Ethernet (registered trademark) is a system in which terminal devices connected to the network perform termination (discard) of Ethernet (registered trademark) frames, and thus this system has a problem that the system had the bus topology and the star topology but no ring topology. Because of this, for example, there are conventionally no token issuing method and token-ring communication method used to perform token ring communication in a ring-topology network constructed by the Ethernet (registered trademark).

The present invention has been made to solve the conventional problem, and it is an object of the present invention to obtain a communication node to perform token ring communication in the ring topology constructed by the Ethernet (registered trademark). It is another object of the present invention to obtain a token issuing method in a ring communication system that defines issue of a token frame in the Ethernet (registered trademark)-base ring communication system. It is still another object of the present invention to obtain a token-ring communication method in the ring communication system that defines a method of performing communications using the token passing system in the Ethernet (registered trademark)-base ring communication system.

Means for Solving Problem

To achieve the above objects, a communication node according to an aspect of the present invention forms a communication system in which a plurality of communication nodes are connected in a ring, the communication nodes being one-to-one connected to each other by Ethernet (registered trademark) which is duplicated with a normal-system ring that transmits a frame when a communication state is normal and with a standby-system ring used for transmission of a frame when the communication state is abnormal. The communication node includes a token-start-right acquisition processor that issues a token-start-right acquisition frame to acquire token start right containing specific information uniquely defined for the communication node after it is confirmed that the formed ring is established, determines a priority based on predetermined reference using specific information for other communication node and the specific information for the own communication node upon reception of a token-start-right acquisition frame from the other communication node, issues the token-start-right acquisition frame at a predetermined time interval when the own communication node has a higher priority than the other communication node, and stops issuing the token-start-right acquisition frame when the own communication node has a lower priority than the other communication node to forward the token-start-right acquisition frame of the other communication node; and a token start processor that passes the token frame to the ring upon reception of the token-start-right acquisition frame which is issued by the token-start-right acquisition processor and circulates around the ring.

Effect of the Invention

According to the present invention, the invention is advantageous in that it is possible to uniquely decide a token issuing station that issues a token frame using specific information uniquely given to each communication node even in a multi-vendor environment in which a ring is formed of communication nodes manufactured by different vendors.

BRIEF DESCRIPTION OF DRAWINGS

FIG. 4-1 is a diagram schematically showing an example of a procedure of a token-start-right acquisition process in the ring communication system (part 1).

FIG. 4-2 is a diagram schematically showing an example of a procedure of a token-start-right acquisition process in the ring communication system (part 2).

FIG. 4-3 is a diagram schematically showing an example of a procedure of a token-start-right acquisition process in the ring communication system (part 3).

FIG. 4-4 is a diagram schematically showing an example of a procedure of a token-start-right acquisition process in the ring communication system (part 4).

FIG. 4-5 is a diagram schematically showing an example of a procedure of a token-start-right acquisition process in the ring communication system (part 5).

FIG. 4-6 is a diagram schematically showing an example of a procedure of a token-start-right acquisition process in the ring communication system (part 6).

FIG. 4-7 is a diagram schematically showing an example of a procedure of a token-start-right acquisition process in the ring communication system (part 7).

FIG. 4-8 is a diagram schematically showing an example of a procedure of a token-start-right acquisition process in the ring communication system (part 8).

FIG. 4-9 is a diagram schematically showing an example of a procedure of a token-start-right acquisition process in the ring communication system (part 9).

FIG. 4-10 is a diagram schematically showing an example of a procedure of a token-start-right acquisition process in the ring communication system (part 10).

FIG. 4-11 is a diagram schematically showing an example of a procedure of a token-start-right acquisition process in the ring communication system (part 11).

FIG. 4-12 is a diagram schematically showing an example of a procedure of a token-start-right acquisition process in the ring communication system (part 12).

FIG. 4-13 is a diagram schematically showing an example of a procedure of a token-start-right acquisition process in the ring communication system (part 13).

FIG. 4-14 is a diagram schematically showing an example of a procedure of a token-start-right acquisition process in the ring communication system (part 14).

FIG. 4-15 is a diagram schematically showing an example of a procedure of a token-start-right acquisition process in the ring communication system (part 15).

FIG. 5 is a block diagram schematically showing a functional configuration of a communication node according to a second embodiment of the present invention.

FIG. 6-1 is a diagram schematically showing an example of a procedure of a token-start-right acquisition process in the ring communication system (part 1).

FIG. 6-2 is a diagram schematically showing an example of a procedure of a token-start-right acquisition process in the ring communication system (part 2).

FIG. 6-3 is a diagram schematically showing an example of a procedure of a token-start-right acquisition process in the ring communication system (part 3).

FIG. 6-4 is a diagram schematically showing an example of a procedure of a token-start-right acquisition process in the ring communication system (part 4).

FIG. 6-5 is a diagram schematically showing an example of a procedure of a token-start-right acquisition process in the ring communication system (part 5).

FIG. 6-6 is a diagram schematically showing an example of a procedure of a token-start-right acquisition process in the ring communication system (part 6).

FIG. 6-7 is a diagram schematically showing an example of a procedure of a token-start-right acquisition process in the ring communication system (part 7).

FIG. 6-8 is a diagram schematically showing an example of a procedure of a token-start-right acquisition process in the ring communication system (part 8).

FIG. 6-9 is a diagram schematically showing an example of a procedure of a token-start-right acquisition process in the ring communication system (part 9).

FIG. 6-10 is a diagram schematically showing an example of a procedure of a token-start-right acquisition process in the ring communication system (part 10).

FIG. 6-11 is a diagram schematically showing an example of a procedure of a token-start-right acquisition process in the ring communication system (part 11).

FIG. 6-12 is a diagram schematically showing an example of a procedure of a token-start-right acquisition process in the ring communication system (part 12).

FIG. 6-13 is a diagram schematically showing an example of a procedure of a token-start-right acquisition process in the ring communication system (part 13).

FIG. 6-14 is a diagram schematically showing an example of a procedure of a token-start-right acquisition process in the ring communication system (part 14).

FIG. 6-15 is a diagram schematically showing an example of a procedure of a token-start-right acquisition process in the ring communication system (part 15).

FIG. 6-16 is a diagram schematically showing an example of a procedure of a token-start-right acquisition process in the ring communication system (part 16).

FIG. 6-17 is a diagram schematically showing an example of a procedure of a token-start-right acquisition process in the ring communication system (part 17).

FIG. 7 is a block diagram schematically showing a functional configuration of a communication node according to a third embodiment of the present invention.

FIG. 8-1 is a diagram showing an example of a communication processing procedure using the token passing system in the ring communication system (part 1).

FIG. 8-2 is a diagram showing an example of a communication processing procedure using the token passing system in the ring communication system (part 2).

FIG. 8-3 is a diagram showing an example of a communication processing procedure using the token passing system in the ring communication system (part 3).

FIG. 8-4 is a diagram showing an example of a communication processing procedure using the token passing system in the ring communication system (part 4).

FIG. 8-5 is a diagram showing an example of a communication processing procedure using the token passing system in the ring communication system (part 5).

FIG. 9-1 is a diagram showing an example of a communication processing procedure using the token passing system in the ring communication system (part 1).

FIG. 9-2 is a diagram showing an example of a communication processing procedure using the token passing system in the ring communication system (part 2).

FIG. 9-3 is a diagram showing an example of a communication processing procedure using the token passing system in the ring communication system (part 3).

FIG. 10-1 is a diagram showing an example of a communication processing procedure using the token passing system in the ring communication system (part 1).

FIG. 10-2 is a diagram showing an example of a communication processing procedure using the token passing system in the ring communication system (part 2).

FIG. 11-1 is a diagram showing an example of a communication processing procedure using the token passing system in the ring communication system (part 1).

FIG. 11-2 is a diagram showing an example of a communication processing procedure using the token passing system in the ring communication system (part 2).

FIG. 11-3 is a diagram showing an example of a communication processing procedure using the token passing system in the ring communication system (part 3).

FIG. 11-4 is a diagram showing an example of a communication processing procedure using the token passing system in the ring communication system (part 4).

FIG. 11-5 is a diagram showing an example of a communication processing procedure using the token passing system in the ring communication system (part 5).

FIG. 12 is a block diagram schematically showing a functional configuration of a communication node according to a seventh embodiment of the present invention.

FIG. 13-1 is a diagram schematically showing an example of a reproduction processing procedure of a token frame due to loss of a token frame (part 1).

FIG. 13-2 is a diagram schematically showing an example of a reproduction processing procedure of a token frame due to loss of a token frame (part 2).

FIG. 13-3 is a diagram schematically showing an example of a reproduction processing procedure of a token frame due to loss of a token frame (part 3).

FIG. 13-4 is a diagram schematically showing an example of the reproduction processing procedure of a token frame due to loss of a token frame (part 4).

Figure 1:
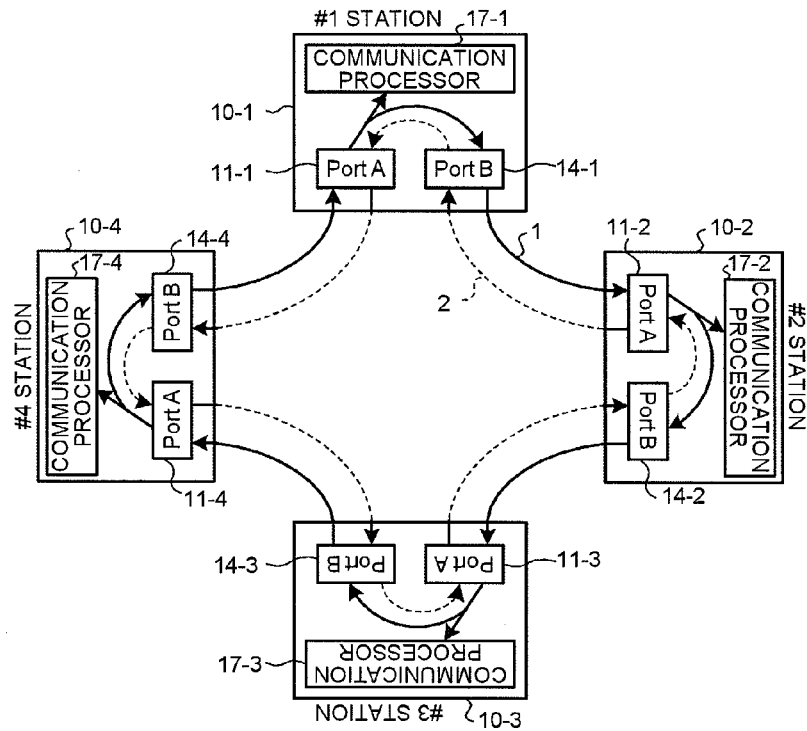
FIG. 1 is a diagram schematically showing a rough configuration of an Ethernet (registered trademark)-base ring communication system according to the present invention.

EXPLANATIONS OF LETTERS OR NUMERALS 10, 10-1 to 10-4 communication node
11, 11-1 to 11-4 A port
12, 12-1 to 12-4 B port
17, 17-1 to 17-4 communication processor
21 token-start-right acquisition processor
22 token start processor
31 frame monitor unit
41 communication-right acquisition processor
42 logical-ring-status control unit
43 data-frame communication processor

BEST MODE(S) FOR CARRYING OUT THE INVENTION

Preferred embodiments of the communication node, and the token issuing method and the token-ring communication method in the ring communication system according to the present invention are explained in detail below with reference to the accompanying drawings. The present invention is by no means limited by these embodiments. In the following, the overview of the configuration of the present invention common to the embodiments is explained, and thereafter, each of the embodiments is explained.

FIG. 1 is a diagram schematically showing a rough configuration of an Ethernet (registered trademark)-base ring communication system according to the present invention. The ring communication system is constructed by connecting a plurality of communication nodes (communication devices, described as nodes in the figure) 10-1 to 10-4 in the shape of a ring, the communication nodes being one-to-one connected to each other by the Ethernet (registered trademark). Here, an Ethernet (registered trademark) cable connecting between the communication nodes 10-1 to 10-4 is physically duplicated with two rings of a normal-system ring 1, indicated by solid line in the figure, that carries a frame in the clockwise in the ring communication system, and of a standby-system ring 2, indicated by dotted line, that carries a frame in the counter-clockwise. The normal-system ring 1 is a ring used when the communication nodes 10-1 to 10-4 and the cable that form the ring communication system are in the normal state. The standby-system ring 2 is a ring used to separate, when abnormality occurs in any one of the communication nodes 10-1 to 10-4 and the cable forming the ring communication system, an abnormal portion from the system by a loop back process, which is explained later.

Figure 2:
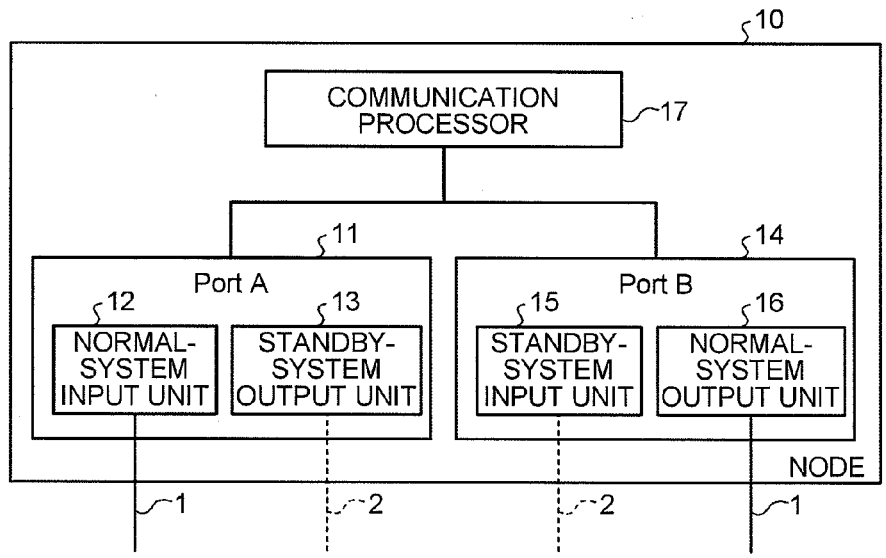
FIG. 2 is a block diagram schematically showing a configuration of a communication node that forms the ring communication system of FIG. 1.

FIG. 2 is a block diagram schematically showing a configuration of an arbitrary communication node 10 in the ring communication system of FIG. 1. The communication node 10 includes two ports 11 and 14 for connecting an Ethernet (registered trademark) cable to neighboring communication nodes, and a communication processor 17 that processes frames received from the ports 11 and 14, and establishes a channel between other communication nodes.

The ports include two ports: A port (Port A in the figure) 11 and B port (Port B in the figure) 14. The A port 11 includes a normal-system input unit 12 that receives a frame through the normal-system ring 1 and a standby-system output unit 13 that transmits a frame to the standby-system ring 2. The B port 14 includes a normal-system output unit 16 that transmits a frame to the normal-system ring 1 and a standby-system input unit 15 that receives a frame through the standby-system ring 2. It is noted that the A port 11 corresponds to "first port" in claims and the B port 14 corresponds to "second port" therein.

The communication processor 17 reads the frame which is input through the normal-system ring 1 and received by the normal-system input unit of the A port 11, and transmits the frame from the normal-system output unit of the B port 14 to the normal-system ring 1 after a predetermined process is performed thereon if necessary. Meanwhile, the communication processor 17 does not read the frame which is input through the standby-system ring 2 and received by the standby-system input unit of the B port 14, and transmits the frame as it is to the standby-system output unit of the A port 11. More specifically, the communication processor 17 performs a predetermined process only on the frame to be output from the B port 14 if necessary in the normal state, but does not perform any process on the frame, to be passed from the B port 14 to the A port 11 in the communication node.

When such an Ethernet (registered trademark)-base ring communication system is constructed, each of the communication nodes 10-1 to 10-4 in this system performs a ring-establishment check process to check whether the network to which each node belongs forms a ring-shaped channel. After the ring-establishment check process is finished, the respective communication nodes 10-1 to 10-4 that form the system transmit station information for the respective own communication nodes required to create configuration information of the network so as to be mutually distributed, and perform the process of creating network configuration information containing a positional relationship of the communication nodes 10-1 to 10-4 and the number of communication nodes 10-1 to 10-4 that form the network. This allows such a state that normal communications can be performed in the Ethernet (registered trademark)-base ring communication system. The following embodiments are based on processes performed in the network in which the ring-establishment check process and the network-configuration-information creation process are finished. Further, the following embodiments are based on the Ethernet (registered trademark)-base ring communication system which performs data communication using the token passing system.

That is the overview of the Ethernet (registered trademark)-base ring communication system common to the embodiments. The respective embodiments will be explained below based on the content. It is noted that the communication nodes 10-1, 10-2, 10-3, and 10-4 are described as #1 station, #2 station, #3 station, and #4 station, respectively, in the following explanation.

For simplification of explanation, the present specification explains a case as an example where the ring communication system is formed of the four communication nodes 10-1 to 10-4, however, the following embodiments of the present invention can be applied to a case in which more than two communication nodes are connected in a ring using the Ethernet (registered trademark).

First Embodiment

The first embodiment explains a token issuing method of deciding which of the communication nodes issues a token frame used to perform token ring communication after the ring-establishment check process and the network-configuration-information creation process are finished in the Ethernet (registered trademark)-base ring communication system.

Figure 3:
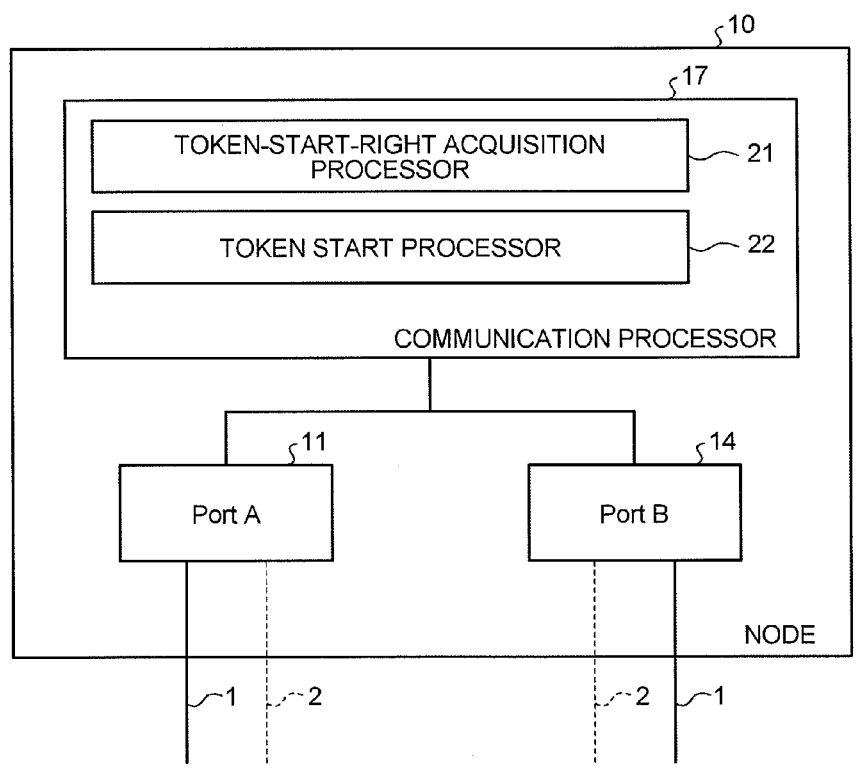
FIG. 3 is a block diagram schematically showing a functional configuration of the communication node according to a first embodiment of the present invention.

FIG. 3 is a block diagram schematically showing a functional configuration of the communication node according to the first embodiment. The communication processor 17 of the communication node 10 according to the first embodiment includes a token-start-right acquisition processor 21 and a token start processor 22. It is noted that the same numerals are assigned to the same components as these in the explanation, and explanation thereof is omitted.

The token-start-right acquisition processor 21 performs a process for acquiring token start right to issue a token frame after the ring-establishment check process and the network-configuration-information creation process are finished. The first embodiment explains a case where the token start right is given to a communication node added with specific information having a smallest value among the communication nodes that form the network, by using unique specific information (no overlap occurs) in the world such as MAC (Media Access Control) address.

In this case, the token-start-right acquisition processor 21 sends out a token-start-right acquisition frame in which the specific information for the own communication node is embedded at a predetermined time interval after the ring-establishment check process and the network-configuration-information creation process are finished. Further, the token-start-right acquisition processor 21 compares specific information within a token-start-right acquisition frame received from other communication node with the specific information for the own communication node, continuously sends out the token-start-right acquisition frame when the value of the specific information for the own communication node is smaller than the other, and discards the token-start-right acquisition frame as the object to be compared. If the value of the specific information for the own communication node is greater than the other, the token-start-right acquisition processor 21 stops sending out the token-start-right acquisition frame, and sends out the token-start-right acquisition frame as the object to be compared. When sending of the token-start-right acquisition frame of the own communication node is stopped, it is determined that the communication node cannot acquire the token start right. Furthermore, if the token-start-right acquisition frame of the own communication node is returned, this means that the token start right is acquired, and thus the token-start-right acquisition processor 21 stops sending the token-start-right acquisition frame.

When the token start right is acquired, the token start processor 22 sends out a token-start notification frame indicating the start of sending a token frame to all the communication nodes on the network (ring) at a predetermined time interval. When the token-start notification frame sent by itself circulates around the ring and is returned, the token start processor 22 discards the token-start notification frame, stops sending the token-start notification frame, and sends out a token frame for performing communication using the token passing system.

Figures 1, 4:
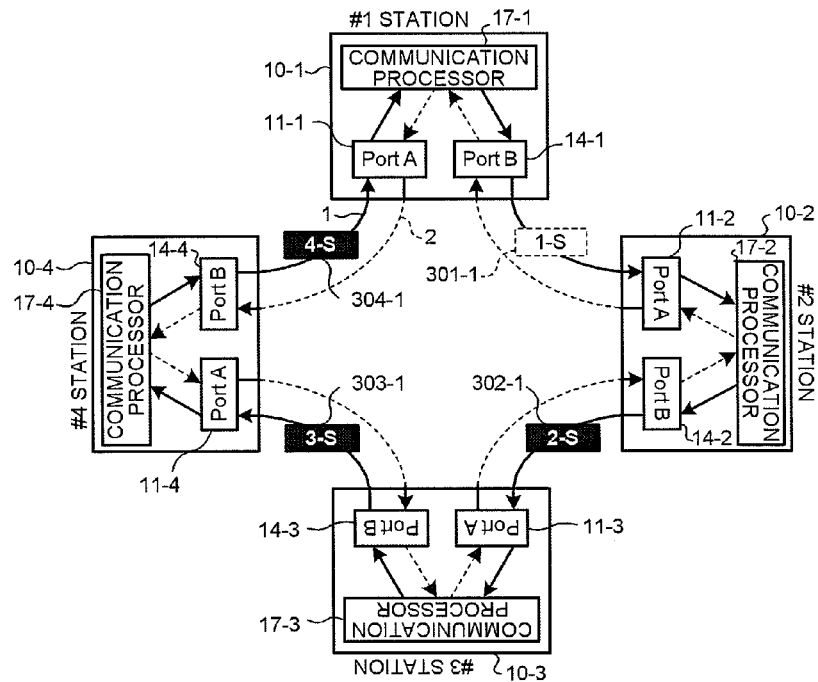
Figures 2, 4:
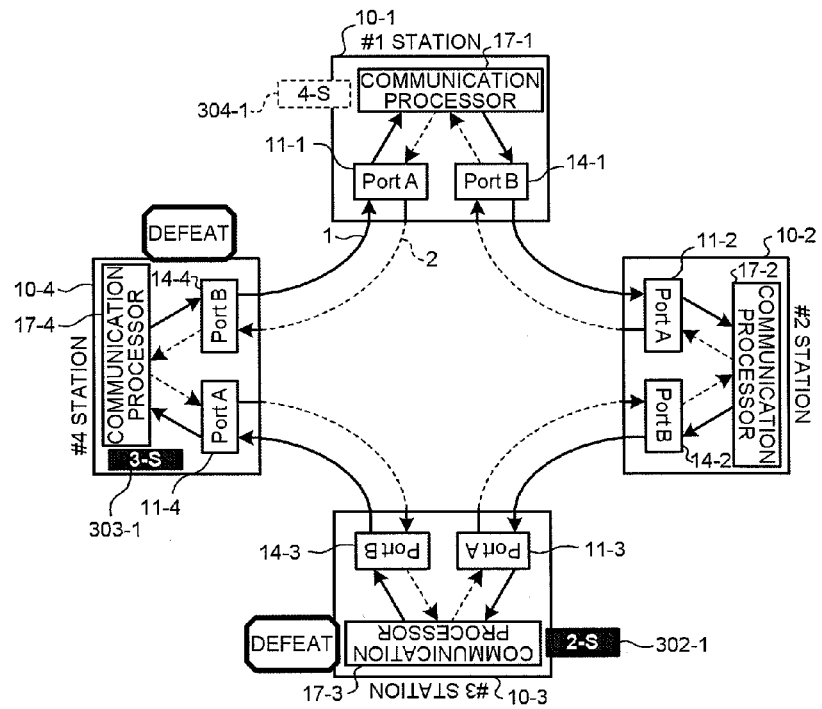
Figures 3, 4:
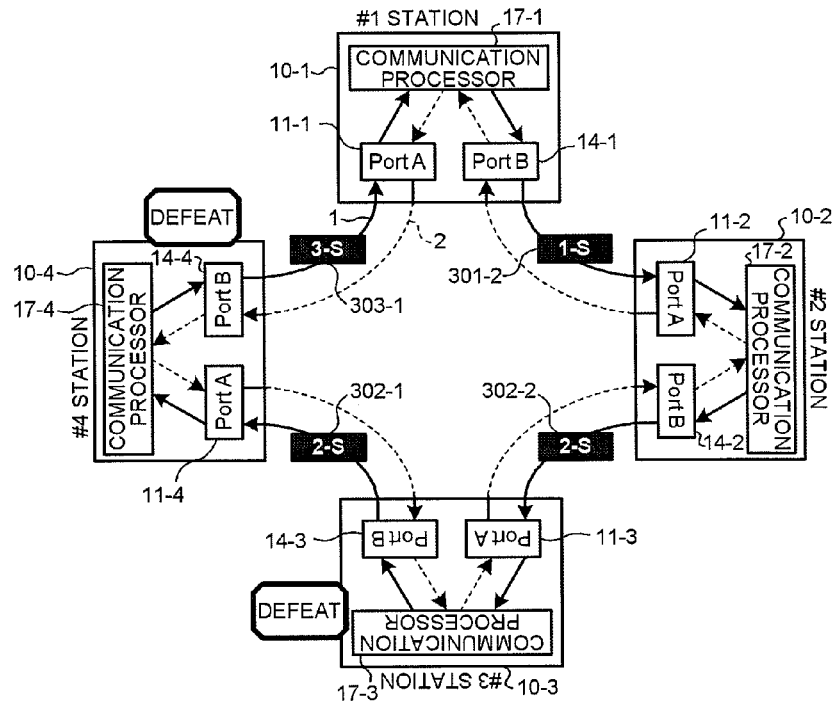
Figure 4:
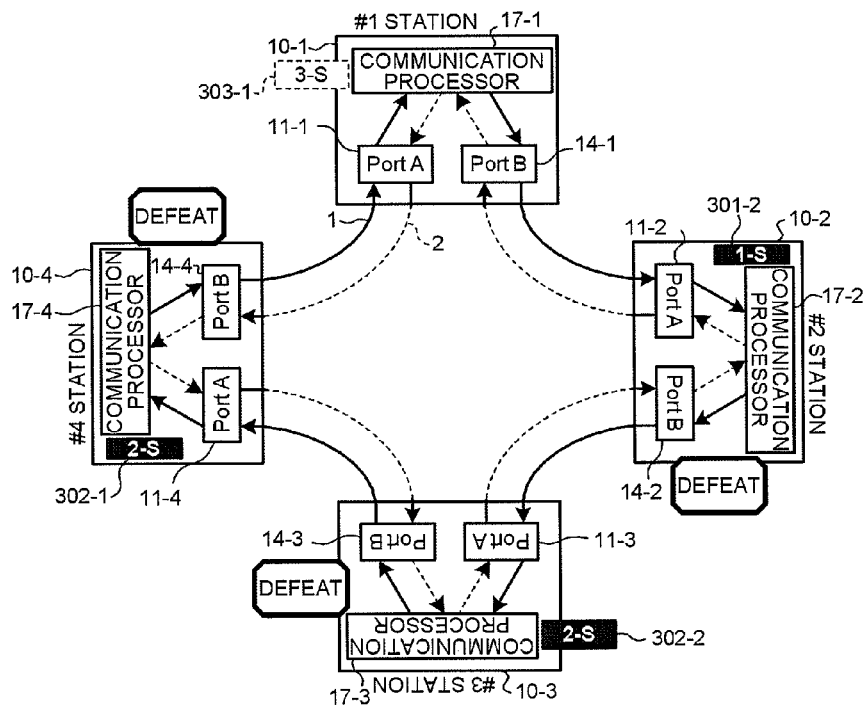

FIG. 4-1 to FIG. 4-15 are diagrams schematically showing an example of a procedure of the token-start-right acquisition process in the ring communication system. First, as shown in FIG. 4-1, upon finishing the ring-establishment check process and the network-configuration-information creation process, the token-start-right acquisition processors 21 of communication processors 17-1 to 17-4 in the stations (#1 station to #4 station) 10-1 to 10-4 send out first token-start-right acquisition frames 301-1 to 304-1 respectively, each in which specific information for each station is embedded, at a predetermined time interval. Now, assume that the first token-start-right acquisition frame 301-1 sent from the #1 station 10-1 is lost due to some reason on the transmission channel between the #1 station 10-1 and the #2 station 10-2.

Next, as shown in FIG. 4-2, when the communication node which has sent out the token-start-right acquisition frame receives a token-start-right acquisition frame sent from other station, the token-start-right acquisition processor 21 of the communication processor 17 performs a magnitude comparison between the specific information for the own communication node and the specific information for the source communication node in the received token-start-right acquisition frame. It is assumed in the example that pieces of the specific information for the stations have such a magnitude relation that #1 station<#2 station<#3 station<#4 station.

The token-start-right acquisition processors 21 of the communication processors 17-3 and 17-4 in the #3 station 10-3 and the #4 station 10-4 respectively receive the token-start-right acquisition frames sent from the communication nodes each with the specific information having a value smaller than each specific information for the respective own stations, forward received first token-start-right acquisition frames 302-1 and 303-1, respectively, and stop transmitting the token-start-right acquisition frames from the own stations. Namely, both the #3 station 10-3 and #4 station 10-4 cannot acquire the token start right, which means that both of those stations are "defeated".

The token-start-right acquisition processor 21 of the communication processor 17-1 in the #1 station 10-1 receives the token-start-right acquisition frame sent from the communication node with the specific information having a value greater than that of the specific information for the own station, discards the received first token-start-right acquisition frame 304-1 issued by the #4 station 10-4, and continues the transmission process of the token-start-right acquisition frame from the own station.

The #2 station 10-2 which does not receive the first token-start-right acquisition frame 301-1 having been issued by the #1 station 10-1 and being lost on the transmission channel cannot perform the magnitude comparison between the pieces of the specific information, and does not therefore perform any process.

Next, as shown in FIG. 4-3, the communication node which is not defeated on the network again sends out the token-start-right acquisition frame after a predetermined time passes, while the communication node which is defeated forwards the received token-start-right acquisition frame of other communication node. Here, the #1 station 10-1 and the #2 station 10-2 belong to the communication node which is not defeated, and therefore send out second token-start-right acquisition frames 301-2 and 302-2, respectively. Meanwhile, the #3 station 10-3 and the #4 station 10-4 belong to the communication node which is defeated, and therefore forward the first token-start-right acquisition frames 302-1 and 303-1 respectively which are issued by the #2 station 10-2 and the #3 station 10-3, respectively.

Figures 4, 5:
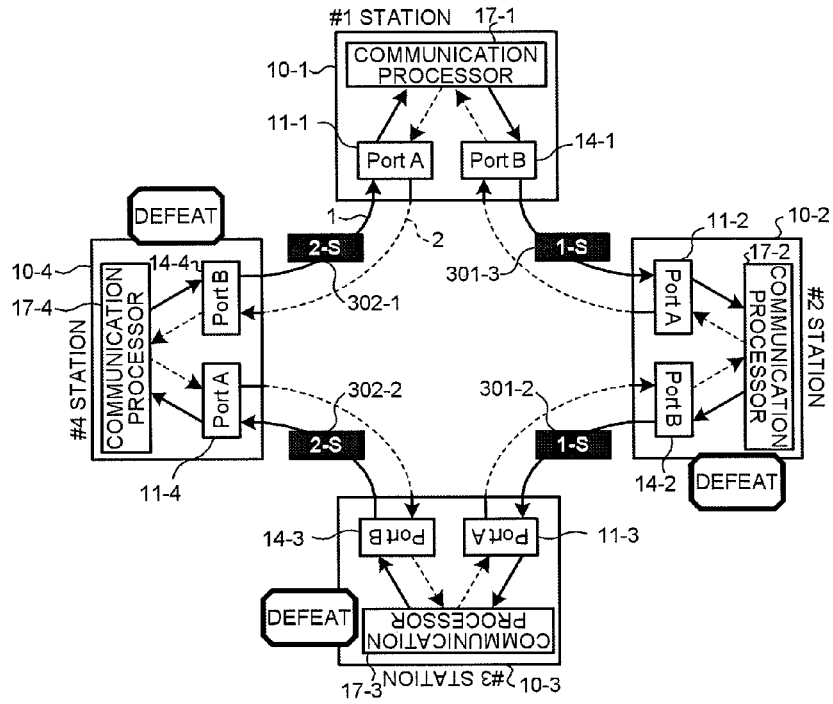

Next, as shown in FIG. 4-4, each of the communication nodes receives the next token-start-right acquisition frame and performs the magnitude comparison between the pieces of the specific information as shown in FIG. 4-2. Here, the #2 station 10-2 newly enters into the defeated state. Consequently, as shown in FIG. 4-5, the #1 station 10-1 discards the first token-start-right acquisition frame 303-1 issued by the received.#3 station 10-3, and sends out a third token-start-right acquisition frame 301-3, while the #2 station 10-2, the #3 station 10-3, and the #4 station 10-4 respectively forward the second token-start-right acquisition frame 301-2, the second token-start-right acquisition frame 302-2, and the first token-start-right acquisition frame 302-1 issued by the #1 station 10-1, the #2 station 10-2, and the #2 station 10-2, respectively.

Here, the token-start-right acquisition frame is successively sent out at a predetermined time interval, and thus even if the token-start-right acquisition frame is incidentally lost due to some cause, the subsequent token-start-right acquisition frame circulates around the ring. As a result, the #2 station 10-2 which cannot previously receive the first token-start-right acquisition frame 301-1 issued by the #1 station 10-1 also receives the token-start-right acquisition frame 301-2 issued by the #1 station 10-1 afterward, so that the #2 station 10-2 can perform the magnitude comparison between the specific information for the own communication node and the specific information for the source communication node of the token-start-right acquisition frame.

The communication node (#3 station 10-3, #4 station 10-4) that stops transmission of the token-start-right acquisition frame performs the magnitude comparison between the specific information for the own station and the specific information for the source station of the token-start-right acquisition frame each time the communication node receives the token-start-right acquisition frame sent from other communication node, and determines whether the received token-start-right acquisition frame is discarded or forwarded.

Similarly, as shown in FIG. 4-6 to FIG. 4-9, each station performs the magnitude comparison between the specific information for the own station and the specific information for the source station of the received token-start-right acquisition frame each time the token-start-right acquisition frame circulates to be received by each communication node. The #2 station 10-2, the #3 station 10-3, and the #4 station 10-4, which receive the token-start-right acquisition frames each with the specific information having a value smaller than the specific information for the own stations, forward the token-start-right acquisition frames, respectively, while the #1 station 10-1 which receives the token-start-right acquisition frame with the specific information having the value greater than the specific information for the own station discards the token-start-right acquisition frame and issues a new token-start-right acquisition frame. In other words, the communication nodes that send out the token-start-right acquisition frames are limited only to the communication node (#1 station 10-1) with the specific information having the smallest value in association with circulation of the token-start-right acquisition frames around the ring.

Thereafter, as shown in FIG. 4-10, the token-start-right acquisition processor 21 of the communication processor 17-1 in the #1 station 10-1 with the specific information having the smallest value receives the second token-start-right acquisition frame 301-2 issued by the own station, and stops sending the token-start-right acquisition frame at the time of reception thereof and thereafter. Further, by acquiring the token-start-right acquisition frame 301-2 issued by the own station, the #1 station 10-1 becomes a communication node which has acquired (won) the token start right, and becomes a token issuing station in the subsequent processes.

Next, as shown in FIG. 4-11, the token start processor 22 of the communication processor 17-1 in the #1 station 10-1 which has acquired the token start right starts to send out a token-start notification frame 311-1 at a predetermined time interval. Thereafter, as shown in FIG. 4-12 to FIG. 4-14, the communication nodes (#2 station 10-2, #3 station 10-3) that receive token-start notification frames 311-1 to 311-2 forward the token-start notification frames 311-1 to 311-2 respectively, and are also in the standby state for token passing. The #1 station 10-1 discards the token-start-right acquisition frame issued by itself.

Thereafter, as shown in FIG. 4-15, the token start processor 22 of the communication processor 17-1 in the #1 station 10-1, which sends out the token-start notification frame, confirms that all the token-start-right acquisition frames on the ring are eliminated (discarded) by the fact that the token-start notification frame 311-1 circulates around the ring and returns to the own station, and starts token passing. With these processes, the token issuing method in the Ethernet (registered trademark)-base ring communication system is finished.

It is noted that the explanation is provided only as an example, and thus, for example, the token start right may be provided to the communication node given with the specific information having the greatest value among the communication nodes 10-1 to 10-4 that form the network.

The reason why the #1 station 10-1 being the token issuing station in the above explanation does not immediately output the token but outputs the token-start notification frame 311-1 will be explained below. Each of the communication nodes 10-1 to 10-4 incorporates therein a frame monitoring function (not shown) that monitors a frame on the network as shown in the following embodiment. If a timeout occurs, the frame monitoring function determines that the token frame is lost, and starts to transmit the token-start-right acquisition frame. At this time, any communication node other than the communication node 10 that issues the token-start-right acquisition frame receives the token-start-right acquisition frame, and the reception causes the state to be switched from a normal communication state (token passing state) to a state of the token-start-right acquisition process, and a token issuing station is again decided similarly to the process. Here, if the communication node 10 cannot acquire the token start right, which is defeated, in the process of deciding the token issuing station without issuing the token-start notification frame and if the state is immediately changed to be ready for token passing, the communication node 10 may receive a token-start-right acquisition frame issued by other communication node 10 if the process of deciding the token issuing station is not completed or the token issuing station is not yet decided, which causes the state to be switched to the state of the token-start-right acquisition process. In this case, the defeated communication node 10 starts again to send out another token-start-right acquisition frame, and this causes the process of deciding the token issuing station not to be settled. To prevent such situations, it is configured to set so that the defeated communication node 10 is not switched to the token passing state in the middle of the process of deciding the token issuing station but to be ready for token passing state after a token-start notification frame 311 is received.

The first embodiment is advantageous that the token issuing station that issues a token frame is uniquely decided based on the size of the specific information uniquely added to the communication node 10 even in a multi-vendor environment in which a ring is formed of the communication nodes 10 manufactured by different vendors. Using a MAC address as specific information does not cause overlap to occur, unlike the specific information set by a user, and thus the embodiment also has an effect that one token issuing station is always uniquely decided.

Further, each communication node 10 is configured to issue the token-start-right acquisition frame at a predetermined time interval until it is determined that the token start right cannot be acquired. Thus, this configuration has also an effect that determination on acquisition of the token start right can be made using the token-start-right acquisition frame issued afterward even if the token-start-right acquisition frame is lost due to some cause on the network. It has also an effect that there is no unnecessary frame on the network, which enables prevention of false recognition of the received frame.

Second Embodiment

The second embodiment explains a token issue process when the token frame is lost caused by any undefined factor. FIG. 5 is a block diagram schematically showing a functional configuration of a communication node according to the second embodiment. The communication processor 17 of the communication node according to the second embodiment further includes a frame monitor unit 31. The frame monitor unit 31 monitors frames passing around the ring when the ring is in a normal communication state, and determines that the token frame is lost if a state in which the token frame and other frames do not pass around the ring continues for a predetermined time.

When it is determined by the frame monitor unit 31 that the token frame is lost, the token-start-right acquisition processor 21 starts to send out a token-start-right acquisition frame. However, if the communication node in the token passing state receives a token-start-right acquisition frame sent from other communication node, the token-start-right acquisition processor 21 discards the received token-start-right acquisition frame only when the value of the specific information for the source communication node of the token-start-right acquisition frame is greater than that of the specific information for the own communication node, and starts to send out a token-start-right acquisition frame from the own communi-cation node. It is noted that the rest of the configuration is the same as the explanation and the same numerals are assigned to those the same as the components in the explanation, and thus explanation thereof is omitted.

FIG. 6-1 to FIG. 6-17 are diagrams schematically showing an example of a procedure of a token-start-right acquisition process in the ring communication system. First, it is assumed that a token frame is lost caused by any undefined factor in the normal communication state of the token ring system. Thereafter, as shown in FIG. 6-1, the frame monitor unit 31 of the communication processor 17-3 in the #3 station 10-3 first detects the loss of the token frame, and the token-start-right acquisition processor 21 starts to send out a token-start-right acquisition frame 303-1 at a predetermined time interval.

Figures 4, 5, 6:
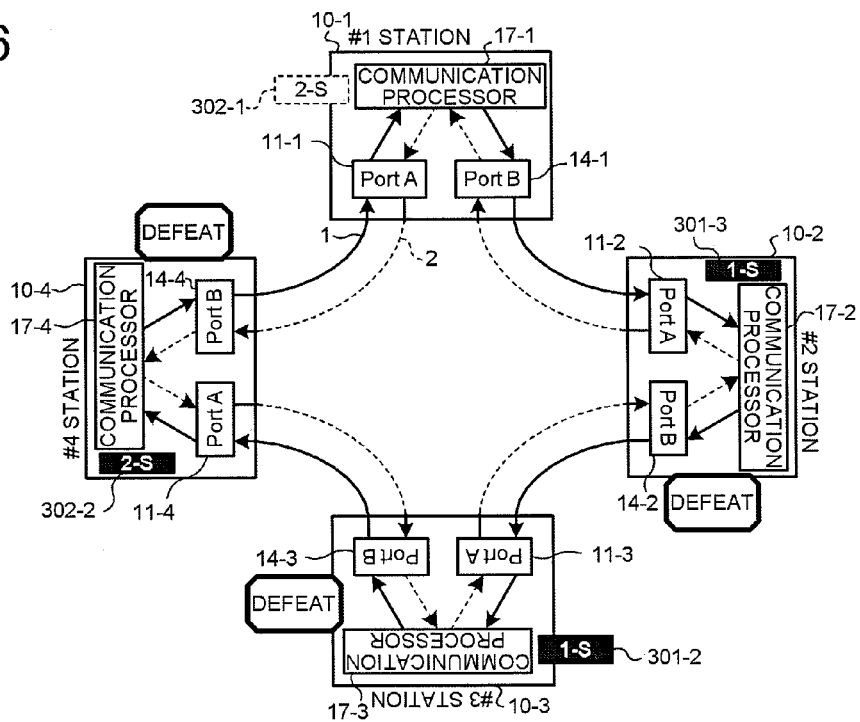

Thereafter, as shown in FIG. 6-2, the #4 station 10-4 during token passing receives the token-start-right acquisition frame 303-1 issued by the #3 station 10-3, and the token-start-right acquisition processor 21 of the communication processor 17-4 performs the magnitude comparison between the specific information for the own station and the specific information for the source communication node (#3 station 10-3) of the token-start-right acquisition frame 303-1. Similarly to the first embodiment, it is also assumed that the pieces of the specific information for the stations have such a magnitude relation as #1 station <#2 station <#3 station <#4 station. Consequently, the #4 station 10-4 receives the token-start-right acquisition frame sent from the communication node with the specific information having a value smaller than the specific information for the own station, and thus the #4 station 10-4 cannot obtain the token start right, which is defeated. As shown in FIG. 6-3, the #4 station 10-4 stops the token passing, and forwards the received token-start-right acquisition frame 303-1 without any change given thereto.

Figures 4, 5, 6, 7:
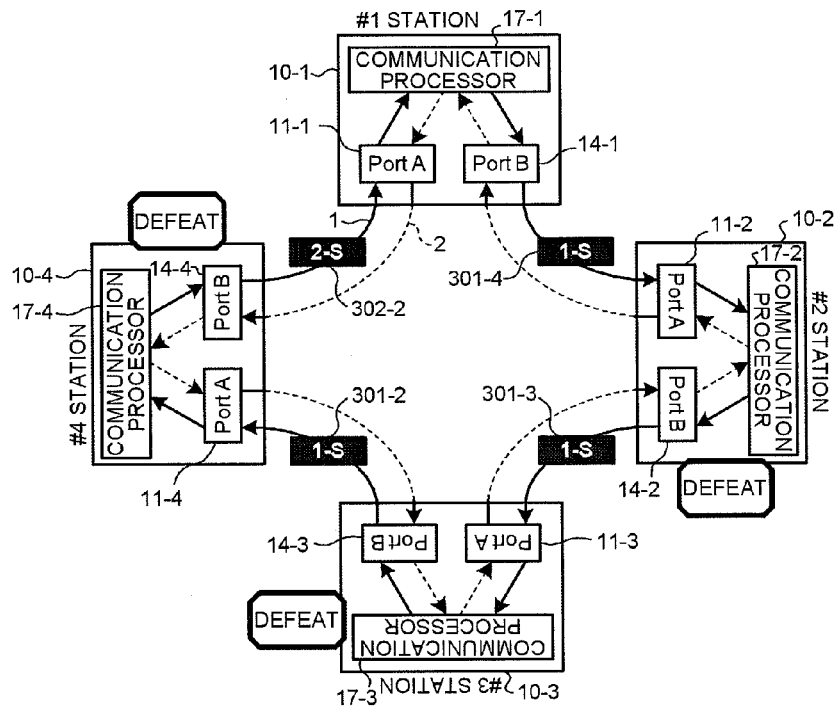

Meanwhile, as shown in FIG. 6-4 to FIG. 6-5, the token-start-right acquisition frame 303-1 next reaches the #1 station 10-1. Similarly to the above, the #1 station 10-1 performs the magnitude comparison between the specific information for the source communication node (#3 station 10-3) of the token-start-right acquisition frame and the specific information for the own station. The token-start-right acquisition processor 21 of the communication processor 17-1 in the #1 station 10-1 receives the token-start-right acquisition frame sent from the communication node with the specific information having the value greater than the specific information for the own station, stops the token passing, discards the received token-start-right acquisition frame 303-1 of the #3 station 10-3, and starts to send out a token-start-right acquisition frame 301-1 from the own station at a predetermined time interval. As shown in FIG. 6-6 to FIG. 6-7, the token-start-right acquisition frames circulate, and the same process is performed in the #1 station 10-1, the #2 station 10-2, and the #4 station 10-4, respectively, each of which receives the next token-start-right acquisition frame. During the process, the #2 station 10-2 that receives the token-start-right acquisition frame 301-1 with the specific information having a value smaller than the specific information for the own station cannot acquire the token start right, which is defeated.

Thereafter, as shown in FIG. 6-8 to FIG. 6-9, when the #3 station 10-3 that originally sends out the token-start-right acquisition frame 303-1 receives the token-start-right acquisition frame 301-1 sent from the #1 station 10-1, the token-start-right acquisition processor 21 of the communication processor 17-3 performs the magnitude comparison between the specific information for the own station and the specific information for the source communication node (#1 station 10-1) in the token-start-right acquisition frame 301-1. Here, the #3 station 10-3 receives the token-start-right acquisition frame 301-1 sent from the #1 station 10-1 with the specific information having the value smaller than the specific information for the own station, and thus the #3 station 10-3 cannot obtain the token start right, which is defeated. Then, the #3 station 10-3 forwards the received token-start-right acquisition frame 301-1 of the #1 station 10-1, and stops the process of sending the token-start-right acquisition frame from the own station.

In this case also, the communication node (#1 station 10-1) that receives the token-start-right acquisition frame sent from the communication node with the specific information having a value greater than the specific information for the own station discards the received token-start-right acquisition frame, and continues transmission of the token-start-right acquisition frame from the own communication node.

Next, as shown in FIG. 6-10 to FIG. 6-11, the communication nodes that send out the token-start-right acquisition frames are limited only to the communication node (#1 station 10-1) with the specific information having the smallest value in association with circulation of the token-start-right acquisition frames 301-1 and 301-2 around the ring.

Thereafter, as shown in FIG. 6-12, the token-start-right acquisition processor 21 of the communication processor 17-1 in the #1 station 10-1 with the specific information having the smallest value first receives the token-start-right acquisition frame 301-1 issued by the own station, and stops sending the token-start-right acquisition frame at the time of reception thereof and thereafter. Further, by acquiring the token-start-right acquisition frame 301-1 issued by the own station, the #1 station 10-1 becomes a communication node which has acquired (won) the token start right, and becomes a token issuing station in the subsequent processes.

Next, as shown in FIG. 6-13, the token start processor 22 of the communication processor 17-1 in the #1 station 10-1 which has acquired the token start right starts to send out a token-start notification frame 311-1 at a predetermined time interval. Thereafter, as shown in FIG. 6-14 to FIG. 6-17, the #2 station 10-2 to the #4 station 10-4 that receive the token-start notification frames 311-1 to 311-4 forward the token-start notification frames 311-1 to 311-4 respectively, and are also in a standby state for token passing. The #1 station 10-1 discards the token-start-right acquisition frame 301-2 issued by itself.

Thereafter, as shown in FIG. 6-17, the token start processor 22 of the communication processor 17-1 in the #1 station 10-1 which sends out the token-start notification frames 311-1 to 311-4 confirms that all the token-start-right acquisition frames on the ring are eliminated (discarded) by the fact that the token-start notification frame 311-1 returns to the own station, and starts token passing. With these processes, the token issuing method is finished.

It is noted that the explanation is provided as an example, and thus, for example, the token start right may be provided to the communication node given with the specific information having the greatest value among the communication nodes 10-1 to 10-4 that form the network.

According to the second embodiment, it is configured to immediately detect the loss of the token frames of the communication nodes in all the stations, and to switch the state of the detected communication node from the token passing state to the token-start-right acquisition state, and thus, it is possible to quickly restart the token passing. Moreover, the second embodiment has an effect that there is no unnecessary frame on the ring and thus false recognition of the received frame can be prevented.

Third Embodiment

The third embodiment explains a case where communications are performed using the token passing system in the Ethernet (registered trademark)-base ring communication system.

FIG. 7 is a block diagram schematically showing a functional configuration of a communication node according to the third embodiment. The communication processor 17 of the communication node 10 includes a communication-right acquisition processor 41, a logical-ring-status control unit 42, and a data-frame communication processor 43. It is noted that the same numerals are assigned to components the same as these in the explanation above, and explanation thereof is therefore omitted.

When the own communication node wishes to transmit data, the communication-right acquisition processor 41 takes a token frame passing around the ring to acquire communication right, and transmits a token-receipt completion notification frame (hereinafter, "token Ack frame") indicating acquisition of the token frame to the communication node that releases the token frame. The communication-right acquisition processor 41 releases the token frame when the data-frame communication processor 43 finishes transmission of the data frame.

The logical-ring-status control unit 42 controls switching between a status in a transmission mode of logically disconnecting the ring within the own communication node and discarding all the frames received by the own communication node without forwarding them when the communication-right acquisition processor 41 acquires the communication right, and a status in a repeat mode of finishing the disconnection of the logical ring and forwarding all the frames received by the own communication node when the token Ack frame is received from other communication node.

The data-frame communication processor 43 that acquires the communication right transmits the data wished to be transmitted as a data frame and the own communication node transmits the data. The structure of the data frame to be communicated at the time is the same as the ordinary Ethernet (registered trademark) frame which contains a destination MAC address and a source MAC address. The data-frame communication processor 43 performs a process of receiving a data frame addressed to the own communication node from other communication node. It is noted that when the own communication node is in the transmission mode, the data-frame communication processor 43 discards all the received frames without forwarding them and forwards all the received frames when the own communication node is in the repeat mode.

Figures 4, 5, 6, 7, 8:
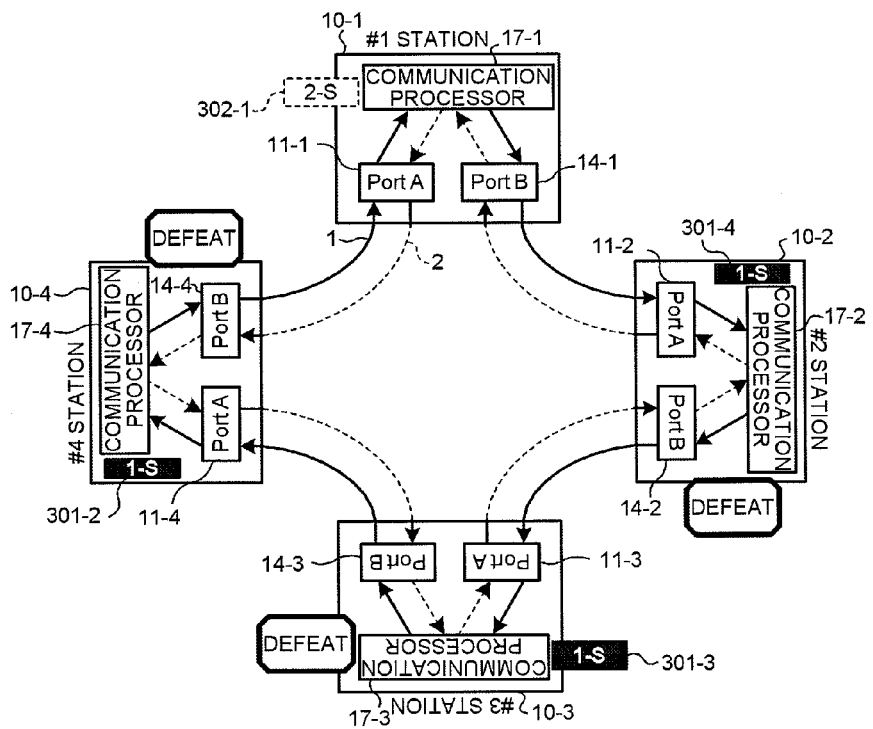

FIG. 8-1 to FIG. 8-5 are diagrams showing an example of a communication processing procedure using the token passing system in the Ethernet (registered trademark)-base ring communication system. Here, a case in which a data frame transmitted as a communication message is addressed to all communication nodes on the ring through broadcast is explained as an example.

First, the #1 station 10-1 that has already acquired a token frame 320 is in the transmission mode in which the ring within the own station is logically disconnected by the logical-ring-status control unit 42 of the communication processor 17, and the data-frame communication processor 43 performs sending of a communication message (hereinafter, "data frame") 321 and a termination process (discard process) on the data frame 321 issued by the own station. When the sending of all the data frames 321 is completed by the data-frame communication processor 43, the communication-right acquisition processor 41 transmits a token frame 320. After the transmission of the token frame 320, the #1 station 10-1 remains in the transmission mode (FIG. 8-1). It is noted that, as shown in the #2 station 10-2 to the #4 station 10-4 of FIG. 8-1, each state in which solid lines are extended from A ports 11-2 to 11-4 to B ports 14-2 to 14-4 respectively indicates the repeat mode, while as shown in the #1 station 10-1, a state in which the solid line is not extended from an A port 11-1 to a B port 14-1 indicates the transmission mode in which the ring is logically disconnected.

Next, the #2 station 10-2 that receives the token frame 320 performs termination (acquisition) of the token frame 320 in the communication-right acquisition processor 41 of the communication processor 17-2. The communication-right acquisition processor 41 receives the token frame 320 from the #1 station 10-1, and therefore transmits a token Ack frame 331 to the #1 station 10-1 which is a token release station. The logical-ring-status control unit 42 logically disconnects the ring in the own station to switch to the transmission mode. The data-frame communication processor 43 performs sending of a data frame 322 and a termination process on the data frame 322 issued by the own station. When the sending of all the data frames 322 is completed by the data-frame communication processor 43, the communication-right acquisition processor 41 transmits the token frame 320. Note that the #2 station 10-2 remains in the transmission mode after the token frame 320 is transmitted (FIG. 8-2).

Thereafter, the frames circulate, and the #1 station 10-1 receives the data frame 321 issued by itself. At this time, because the #1 station 10-1 is in the transmission mode, the data-frame communication processor 43 discards the received data frame 321 (FIG. 8-3).

Subsequently, the #1 station 10-1 receives the token Ack frame 331 addressed to the own station. At this time, because the #1 station 10-1 is in the transmission mode, the data-frame communication processor 43 discards the received token Ack frame 331, and the logical-ring-status control unit 42 switches the status of the own station, upon reception of the token Ack frame 331, from the transmission mode to the repeat mode in which logical disconnection of the ring is finished (FIG. 8-4). Thereafter, all the frames received from the A port 11-1 of the #1 station 10-1 are forwarded (FIG. 8-5). The stations perform the processes shown in FIG. 8-1 to FIG. 8-5, so that communications using the token passing system are performed.

According to the third embodiment, it is configured to set the transmission mode of logically disconnecting the ring within the communication node 10, in the communication node 10 that acquires the communication right, and to set the repeat mode of forwarding the received frame in the communication node 10 that does not acquire the communication right. Thus, the third embodiment has an effect that the communication node 10 that acquires the communication right can discard the frame issued by the own communication node 10 without fragmenting the frame.

It is also configured that the communication node 10 which takes a token frame and acquires the communication right transmits the token Ack frame to the source communication node of the token frame. Thus, the third embodiment has an effect that the switching from the transmission mode to the repeat mode can be performed using the token Ack frame. Consequently, it is possible to remove the frame and the token Ack frame issued by the own communication node 10 from the ring, and to prevent any unnecessary frame from staying on the ring.

Fourth Embodiment

The third embodiment is configured that the communication node which releases the token frame and is in the transmission mode (hereinafter, "token-released communication node") receives the token Ack frame addressed to the own station from a next communication node which acquires the token frame (hereinafter, "token-acquired communication node"), to thereby change the state from the transmission mode to the repeat mode. In this case, however, the token Ack frame sent from the token-acquired communication node may sometimes be lost by any cause. In the fourth embodiment, a communication method using the token passing system when the token Ack frame is lost before it reaches the token-released communication node will be explained below.

The functional configuration of the communication node according to the fourth embodiment is the same as that of FIG. 7 according to the third embodiment. In the fourth embodiment, however, the logical-ring-status control unit 42 of the communication processor 17 in FIG. 7 further includes a function of changing to the repeat mode, in the transmission mode, upon reception of the data frame transmitted by other communication node (token-acquired communication node) before the token Ack frame addressed to the own communication node is received.

Figures 4, 5, 6, 7, 8, 9:
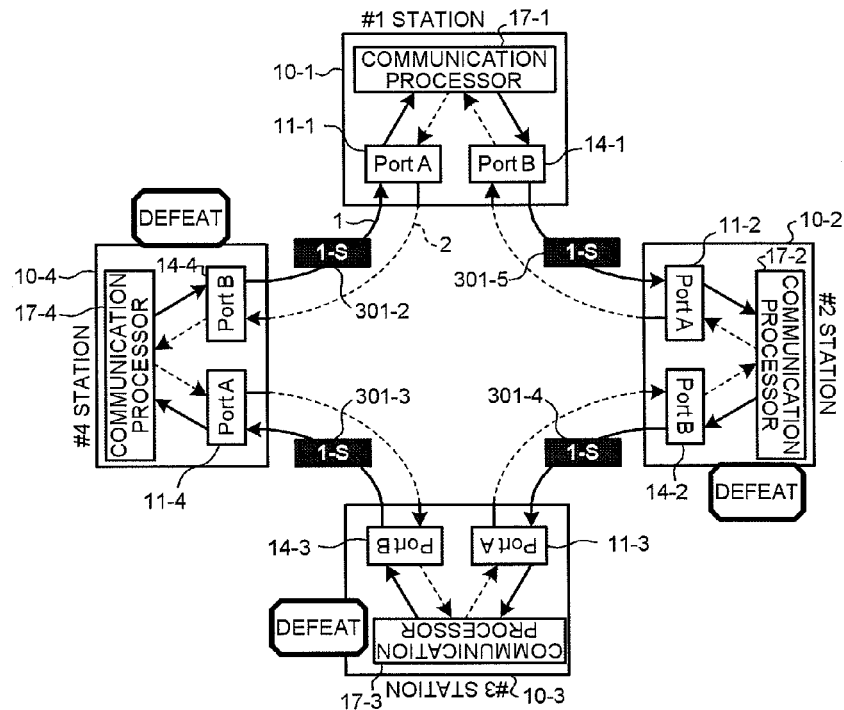

FIG. 9-1 to FIG. 9-3 are diagrams showing an example of a communication processing procedure using the token passing system in the Ethernet (registered trademark)-base ring communication system. First, as explained with reference to FIG. 8-1 to FIG. 8-2 of the third embodiment, the #2 station 10-2 sends out the data frame 321, takes the token frame 320 from the #1 station 10-1 that releases the token frame 320, and sends the token Ack frame 331 addressed to the #1 station 10-1 which is the token-released communication node and the data frame 322 out on the ring.

Thereafter, the frames circulate, and the #1 station 10-1 receives the data frame 321 issued by itself. At this time, because the #1 station 10-1 is in the transmission mode, the data-frame communication processor 43 discards the received data frame 321. At this time, it is assumed that the token Ack frame 331 is lost on the ring between the #4 station 10-4 and the #1 station 10-1 caused by any undefined factor (FIG. 9-1).

Thereafter, the #1 station 10-1 receives the data frame 322 issued by other station (#2 station 10-2) without receiving the token Ack frame 331 addressed to the own station (FIG. 9-2). The logical-ring-status control unit 42 of the communication processor 17-1 in the #1 station 10-1 detects that the data frame 322 of the other station is received without receiving the token Ack frame 331, switches the state of the own station from the transmission mode to the repeat mode, and finishes the logical disconnection of the ring within the #1 station 10-1. Consequently, the data-frame communication processor 43 of the communication processor 17-1 in the #1 station 10-1 forwards the received data frame 322 sent from the #2 station 10-2 as it is, and forwards all the frames received thereafter (FIG. 9-3).

According to the fourth embodiment, even if the token Ack frame is lost, the state of the token-released communication node can be changed from the transmission mode to the repeat mode using the function that the data frame arrives after the token Ack frame. As a result, the fourth embodiment has an effect that even if the token Ack frame is lost, the subsequent frame is prevented from being carelessly discarded.

Fifth Embodiment

The fourth embodiment is configured that even if the token Ack frame addressed to the own station is lost, the token-released communication node changes the state from the transmission mode to the repeat mode by reception of the data frame received after the loss. In this case, however, there is also a case in which the data frame may be lost due to any cause in addition to the token Ack frame sent from the token-acquired communication node. The fifth embodiment explains the communication method using the token passing system when the token Ack frame and the data frame issued by the token-acquired communication node are lost before they reach the token-released communication node.

The functional configuration of the communication node according to the fifth embodiment is the same as that of FIG. 7 according to the third embodiment. In the fifth embodiment, however, the logical-ring-status control unit 42 of the communication processor 17 in FIG. 7 further includes a function of changing to the repeat mode, in the transmission mode, upon reception of the data frame transmitted by other communication node (token-acquired communication node) before the token Ack frame addressed to the own communication node is received, or upon reception of the token Ack frame addressed to other communication node issued by further another communication node before the token Ack frame addressed to the own communication node and the data frame issued by the other communication node (token-acquired communication node) are received.

Figures 4, 5, 6, 7, 8, 9, 10:
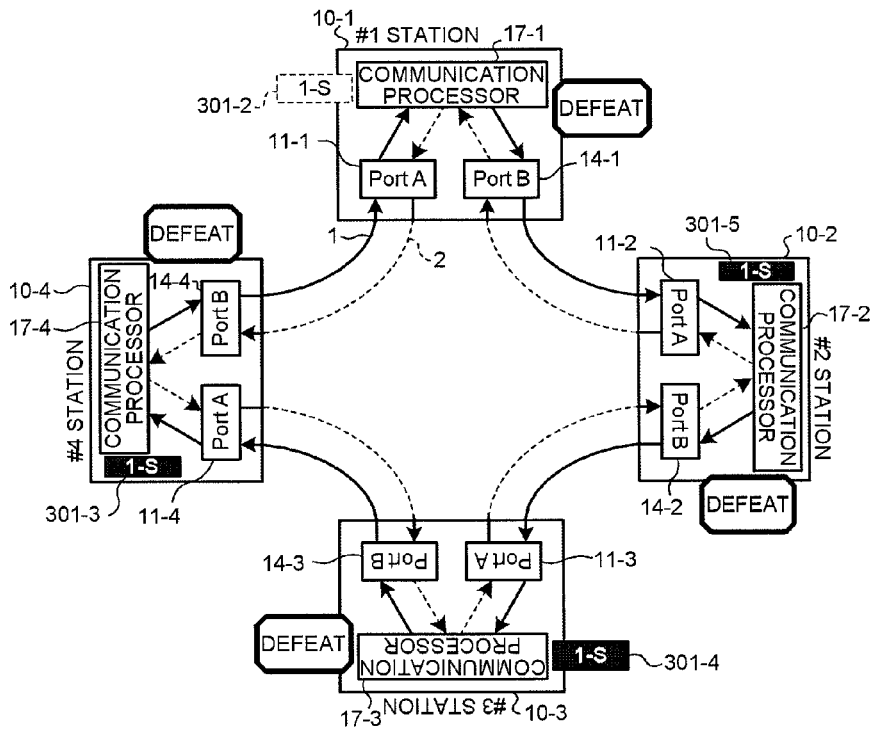

FIG. 10-1 to FIG. 10-2 are diagrams showing an example of a communication processing procedure using the token passing system in the Ethernet (registered trademark)-base ring communication system. First, as explained with reference to FIG. 8-1 to FIG. 8-2 of the third embodiment, the #2 station 10-2 sends out the data frame 321, takes the token frame 320 from the #1 station 10-1 that releases the token frame 320, sends the token Ack frame 331 addressed to the #1 station 10-1 which is the token-released communication node and the data frame 322 out on the ring, and then releases the token frame 320. Thereafter, as explained with reference to FIG. 9-1 according to the fourth embodiment, the frames circulate, and the #1 station 10-1 receives the data frame 321 issued by itself, and discards the relevant data frame 321. At this time, it is assumed that the #3 station 10-3 takes the token frame 320 and the token Ack frame 331 is lost caused by any undefined factor on the ring between the #4 station 10-4 and the #1 station 10-1.

The frames further circulates, however, it is assumed that the data frame 322 issued by the #2 station 10-2 is also lost on the transmission channel between the #4 station 10-4 and the #1 station 10-1. Meanwhile, the communication-right acquisition processor 41 in the #3 station 10-3 that takes the token frame 320 transmits a token Ack frame 332 addressed to the #2 station 10-2 which is a source of the token frame 320. Thereafter, the data-frame communication processor 43 of the #3 station 10-3 transmits a data frame 323 (FIG. 10-1).

Thereafter, the #1 station 10-1 receives the token Ack frame 332 addressed to the #2 station 10-2 issued by the #3 station 10-3 without receiving the token Ack frame 331 addressed to the own station and the data frame 322 that is supposed to be issued by other station (#2 station 10-2). The logical-ring-status control unit 42 of the communication processor 17-1 in the #1 station 10-1 detects that the token Ack frame 332 addressed to the #2 station 10-2 issued by the #3 station 10-3 is received without receiving the token Ack frame 331 addressed to the own station and the data frame 322 issued by the #2 station 10-2, switches the state of the own station from the transmission mode to the repeat mode, and finishes the logical disconnection of the ring within the #1 station 10-1. Consequently, the data-frame communication processor 43 of the communication processor 17-1 in the #1 station 10-1 forwards the received token Ack frame 332 addressed to the #2 station 10-2 issued by the #3 station 10-3 as it is, and forwards all the frames received thereafter (FIG. 10-2).

According to the fifth embodiment, by using the function that a data frame (data frame) arrives after a token Ack frame and a token Ack frame addressed to some other station issued by other communication node arrives after the data frame, the state of the token-released communication node can be changed from the transmission mode to the repeat mode even if the token Ack frame and the data frame are lost. As a result, the fifth embodiment has an effect that even if the token Ack frame and the data frame are lost, the subsequent frame is prevented from being carelessly discarded.

Sixth Embodiment

The fifth embodiment is configured that even if the token Ack frame addressed to the own communication node and the subsequent data frame are lost, the state of the token-released communication node is changed from the transmission mode to the repeat mode by reception of the token Ack frame addressed to some other communication node issued by other station which is received after they are lost. In addition, the sixth embodiment explains a communication method using the token passing system when a token Ack frame and a data frame issued by other communication node and addressed to some other communication node are lost and a communication node that is supposed to receive a token Ack frame addressed to the own communication node receives the token frame without receiving the token Ack frame and the data frame.

The functional configuration of the communication node according to the sixth embodiment is the same as that of FIG. 7 according to the third embodiment. In the sixth embodiment, however, the communication-right acquisition processor 41 of the communication processor 17 in FIG. 7 further includes a function of taking a token frame and transmitting a token Ack frame to a source communication node of the token frame, in the transmission mode, when a token frame is again received without receiving a data frame issued by other communication node and a token Ack frame addressed to other communication node in addition to the token Ack frame addressed to the own communication node. The data-frame communication processor 43 further includes a function of again transmitting the data frame issued by the own communication node received before receiving the token Ack frame addressed to the own communication node.

Figures 4, 5, 6, 7, 8, 9, 10, 11:
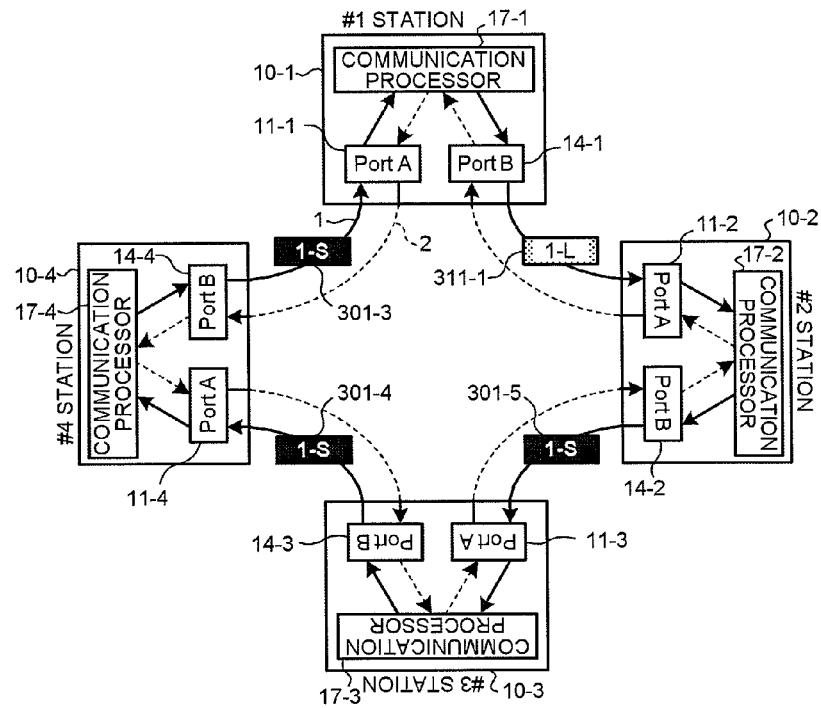

FIG. 11-1 to FIG. 11-5 are diagrams showing an example of a communication processing procedure using the token passing system in the Ethernet (registered trademark)-base ring communication system. First, as explained with reference to FIG. 8-1 to FIG. 8-2 of the third embodiment, the #2 station 10-2 sends out the data frame 321, takes the token frame 320 from the #1 station 10-1 that releases the token frame 320, sends the token Ack frame 331 addressed to the #1 station 10-1 which is the token-released communication node and the data frame 322 out on the ring, and then releases the token frame.

Thereafter, the frames circulate, and the #1 station 10-1 receives the data frame 321 issued by itself. At this time, because the #1 station 10-1 is in the transmission mode, the data-frame communication processor 43 discards the received data frame 321. Further, at this time, it is assumed that the #3 station 10-3 takes the token frame 320 and acquires the communication right, and that the token Ack frame 331 addressed to the #1 station 10-1 is lost caused by any undefined factor on the ring between the #4 station 10-4 and the #1 station 10-1 (FIG. 11-1).

It is further assumed that although the frames circulate, the data frame 322 issued by the #2 station 10-2 and the token Ack frame 332 addressed to the #2 station 10-2 issued when the #3 station 10-3 takes the token frame 320 are also lost caused by any undefined factor on the ring between the #4 station 10-4 and the #1 station 10-1. At this time, the #3 station 10-3 sends out the data frame 323 and then releases the token frame 320 (FIG. 11-2).

The frames further circulate, and the #4 station 10-4 takes the token frame 320 and acquires the communication right. It is also assumed that the data frame 323 issued by the #3 station 10-3 and a token Ack frame 333 addressed to the #3 station 10-3 issued when the #4 station 10-4 takes the token frame 320 are also loss caused by any undefined factor on the ring between the #4 station 10-4 and the #1 station 10-1 (FIG. 11-3).

Next, the #4 station 10-4 transmits a data frame 324 and releases the token frame 320. At this time, it is assumed that the data frame 324 issued by the #4 station 10-4 is also lost caused by any undefined factor on the ring between the #4 station 10-4 and the #1 station 10-1 (FIG. 11-4). Thereafter, the #1 station 10-1 receives the token frame 320 released by the #4 station 10-4. The communication-right acquisition processor 41 of the #1 station 10-1 receives the data frame 321 previously issued by the own station, and then again receives the token frame 320 without receiving even any one of the token Ack frame 331 addressed to the own communication node, the data frames 322 to 324 issued by other stations, and the token Ack frames 332 and 333 addressed to other communication nodes. Thus the communication-right acquisition processor 41 takes the received token frame 320 and acquires the communication right. Additionally, the communication-right acquisition processor 41 transmits a token Ack frame 334 to the #4 station 10-4 which is the token-released communication node (FIG. 11-5). The data-frame communication processor 43 again transmits the data frame 321 transmitted in FIG. 8-1, and then releases the token frame 320. It is noted that the logical-ring-status control unit 42 does not switch the state because the #1 station 10-1 is already in the transmission mode upon reception of the token frame 320.

Thereafter, in the communication nodes (#3 station 10-3 and #4 station 10-4) provided in the downstream side of the #2 station 10-2, if no frame is lost, the state is switched from the transmission mode to the repeat mode as explained in the fifth embodiment, using the token Ack frame 334 addressed to the #4 station 10-4 transmitted by the #1 station 10-1.

According to the sixth embodiment, it is configured that when receiving a token frame without receiving a token Ack frame and a data frame, the communication node which is supposed to receive the token Ack frame addressed to the own station takes the token frame and transmits the data frame the same as that received before the token Ack frame addressed to the own communication node is received. Thus, the sixth embodiment has an effect that the data can be reliably delivered to a destination communication node.

Seventh Embodiment

The seventh embodiment explains a regeneration process of a token frame when the token frame is lost caused by any undefined factor during communication using the token passing system.

Figures 4, 5, 6, 7, 8, 9, 10, 11, 12:
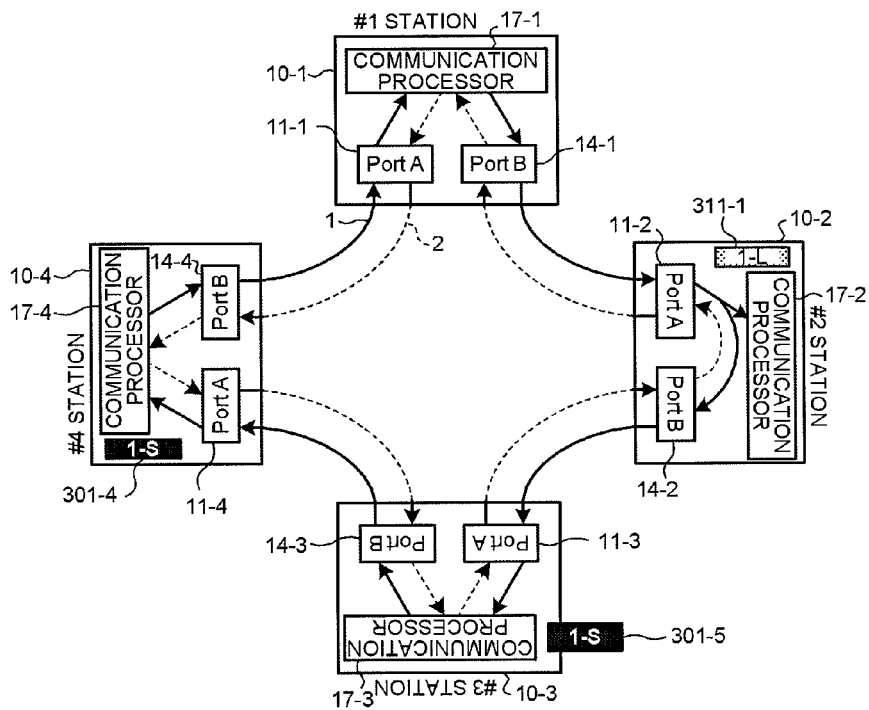

FIG. 12 is a block diagram schematically showing a functional configuration of a communication node according to the seventh embodiment. The communication node 10 is configured to combine the configuration of FIG. 5 according to the second embodiment with that of FIG. 7 according to the third embodiment. Specifically, the communication processor 17 of the communication node 10 includes the token-start-right acquisition processor 21 that performs the acquisition process of the token start right, the token start processor 22 that performs notification that a communication node acquiring the token start right starts communication using the token passing system to all the communication nodes on the ring, the frame monitor unit 31 that monitors the token frame, the token Ack frame, and the data frame passing around the ring, the communication-right acquisition processor 41 that performs the process of acquiring communication right in the state of starting the communication using the token passing system, the logical-ring-status control unit 42 that controls switching between a status of logically disconnecting the ring within the communication node and a status of logically connecting the ring, and the data-frame communication processor 43 that performs a communication process of the data frame.

Here, the frame monitor unit 31 monitors all the frames including the token frame, the token Ack frame, and the data frame which pass around the ring, and detects that the token may be lost if the frames do not pass around the ring for more than a predetermined time.

Figures 4, 5, 6, 7, 8, 9, 10, 11, 12, 13:
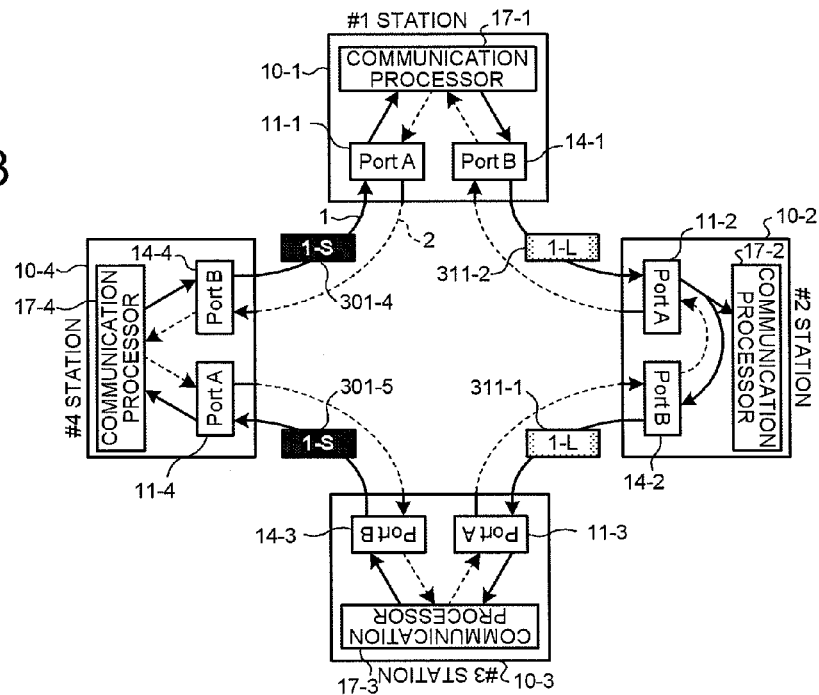
Figures 4, 5, 6, 7, 8, 9, 10, 11, 12, 13, 14:
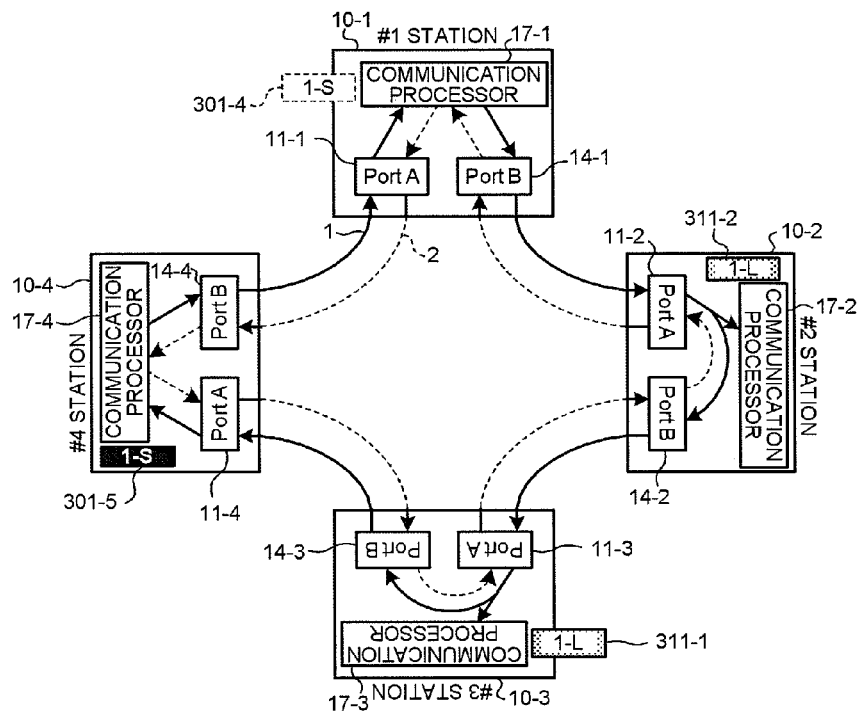
Figures 4, 5, 6, 7, 8, 9, 10, 11, 12, 13, 14, 15:
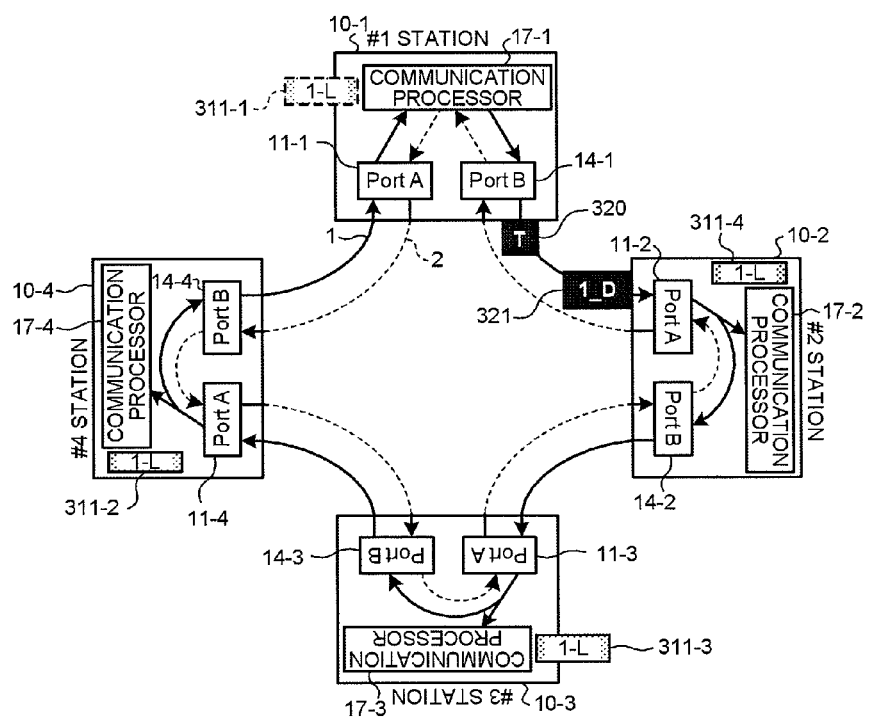
Figure 5:
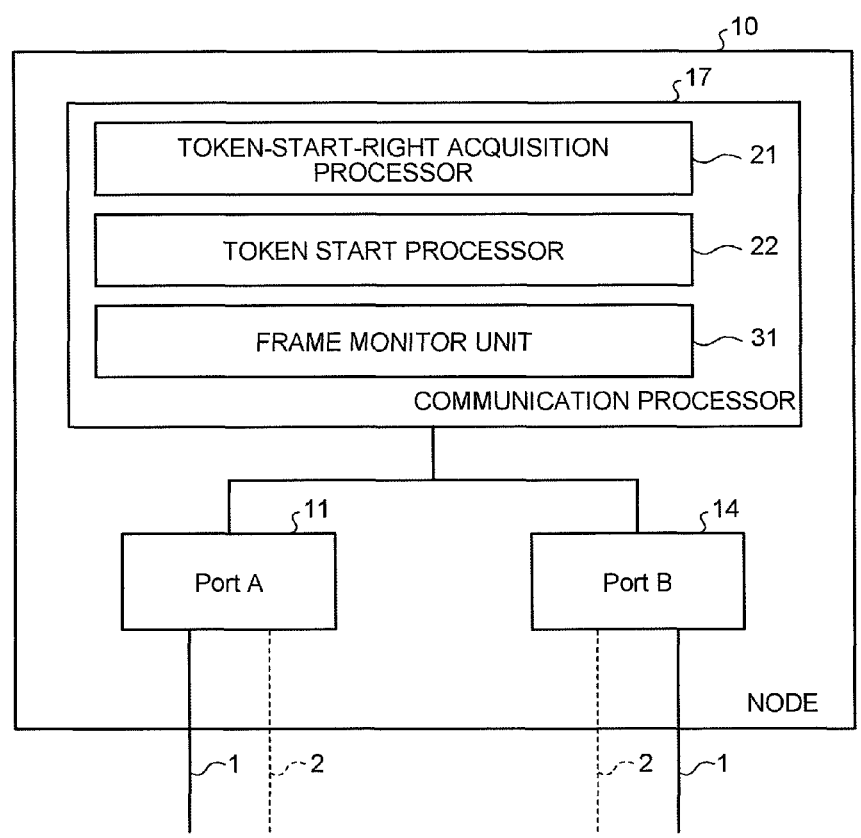
Figures 1, 6:
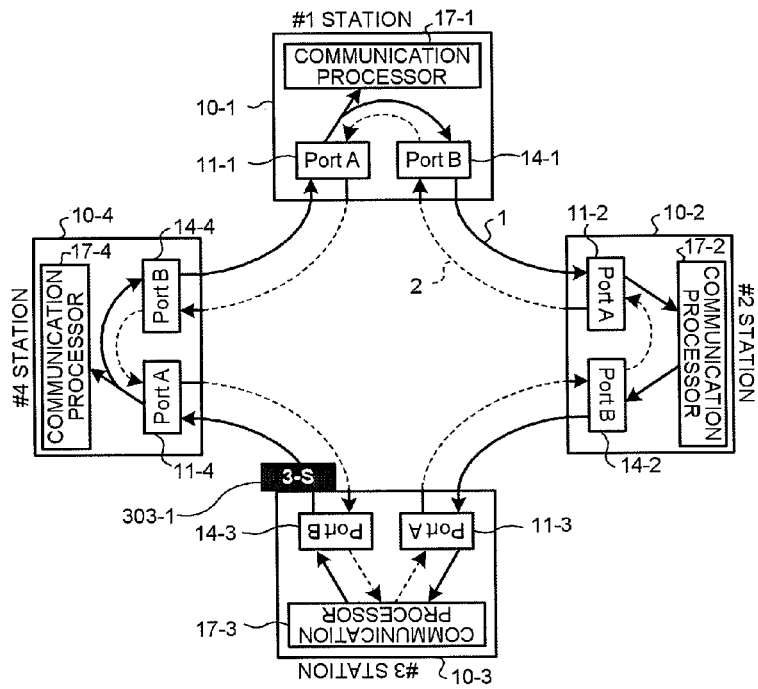
Figures 2, 6:
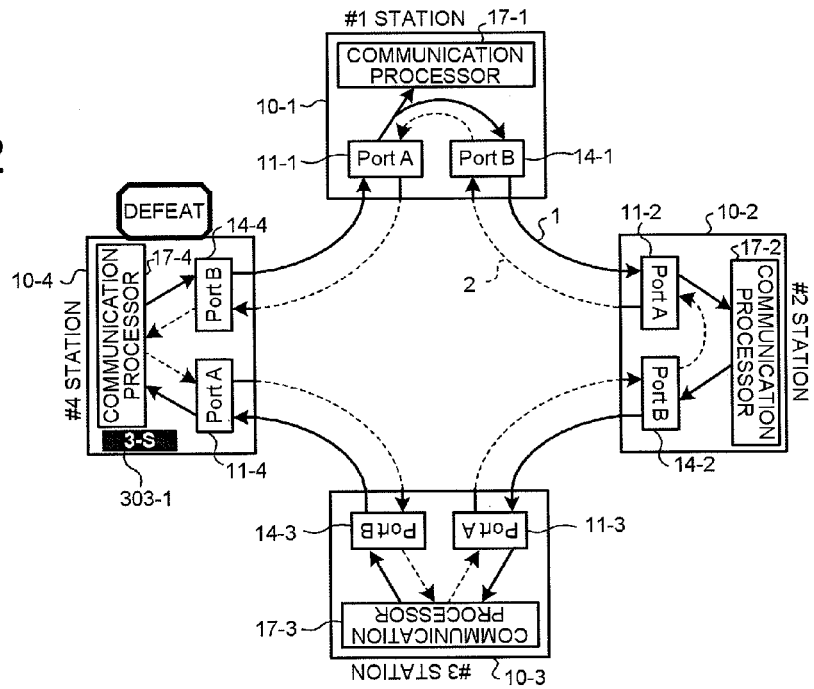
Figures 3, 6:
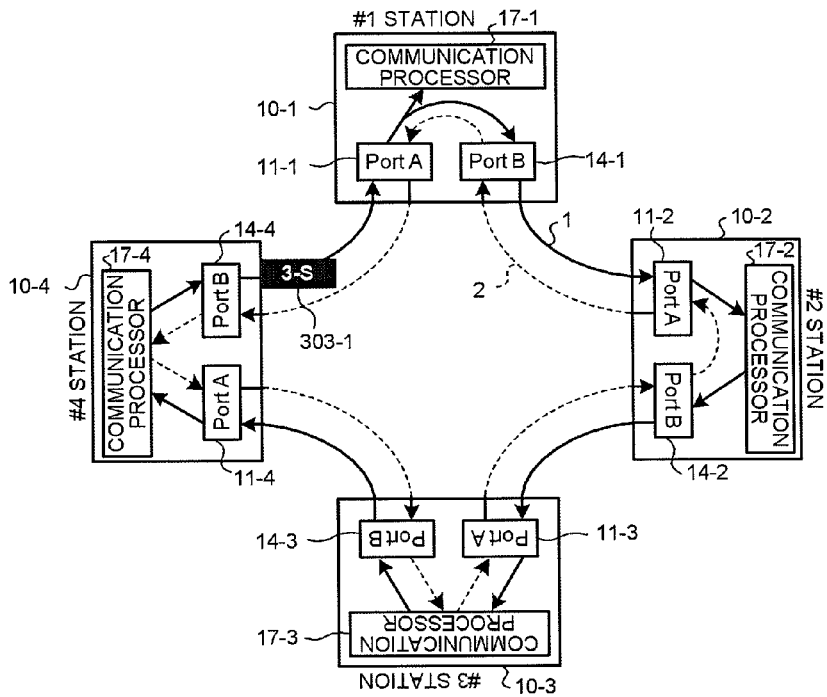
Figures 4, 6:
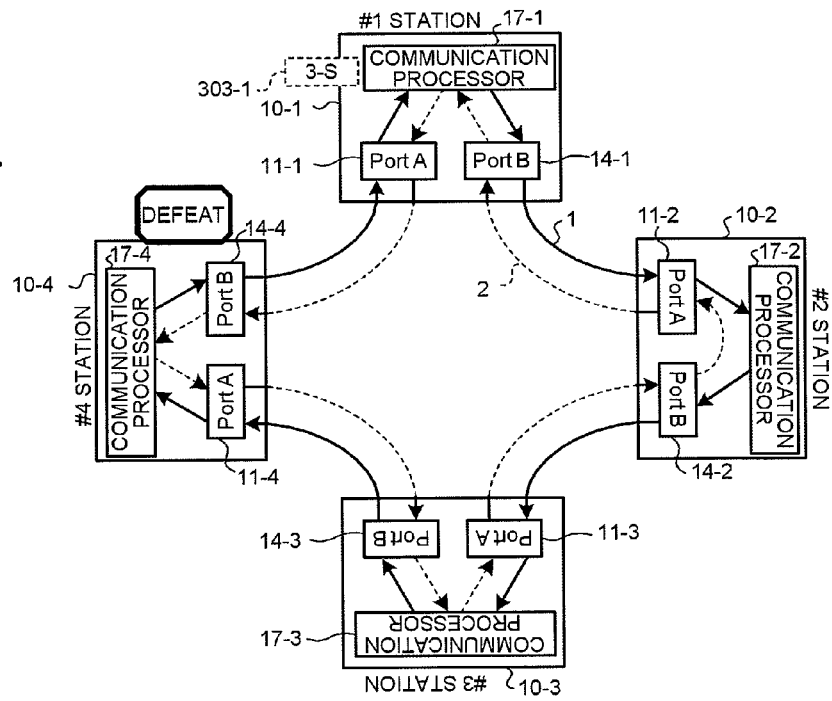
Figures 5, 6:
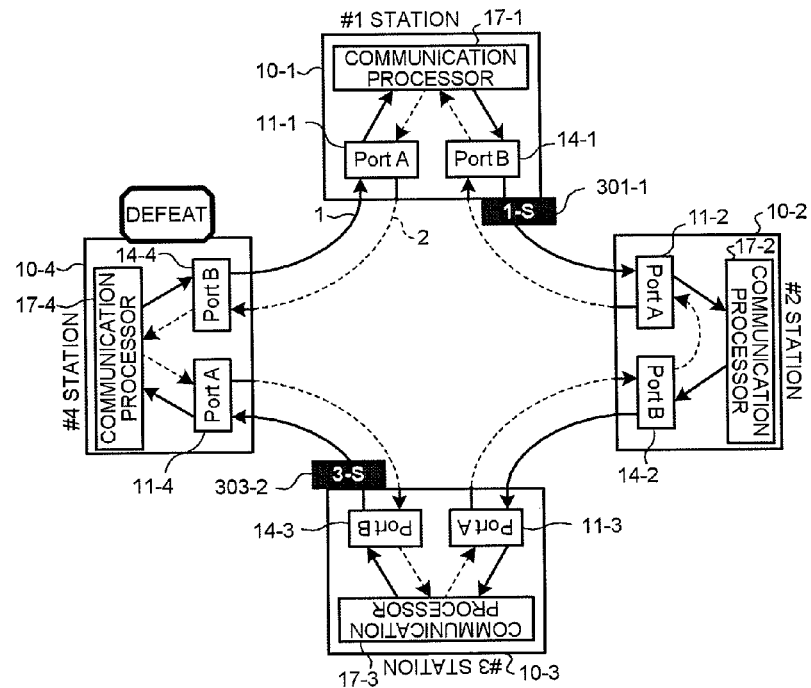
Figure 6:
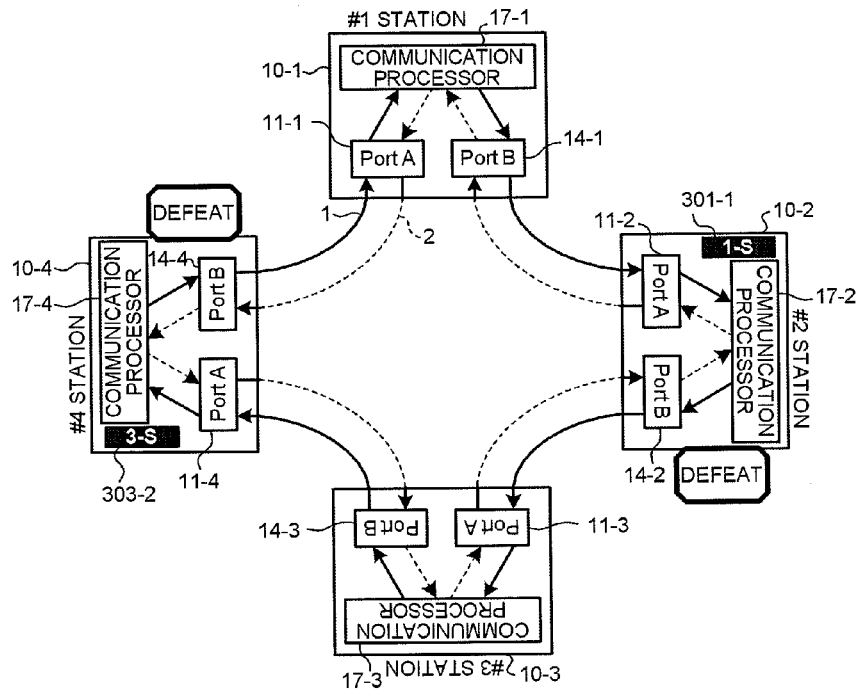
Figures 6, 7:
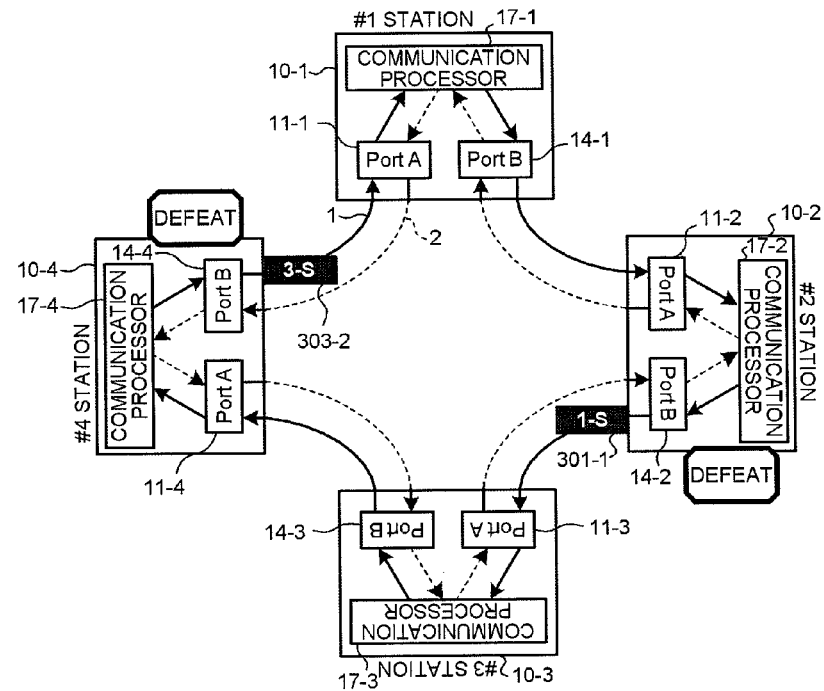
Figures 6, 7, 8:
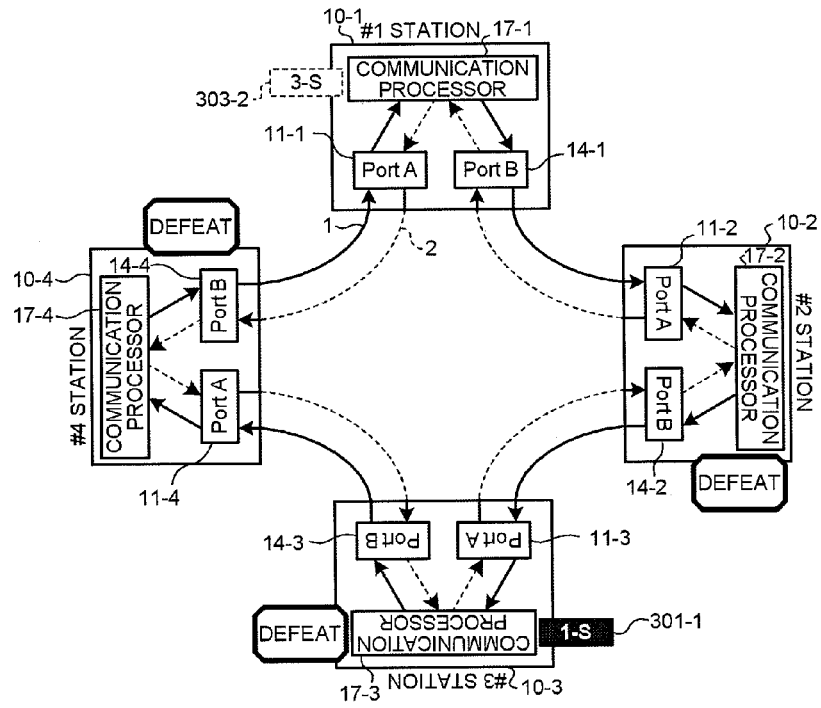
Figures 6, 7, 8, 9:
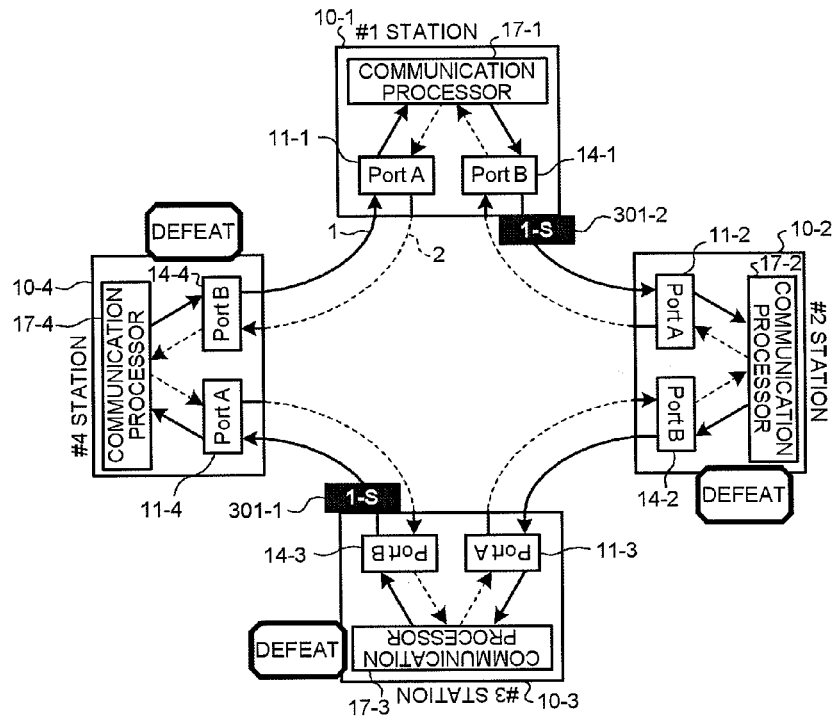
Figures 6, 7, 8, 9, 10:
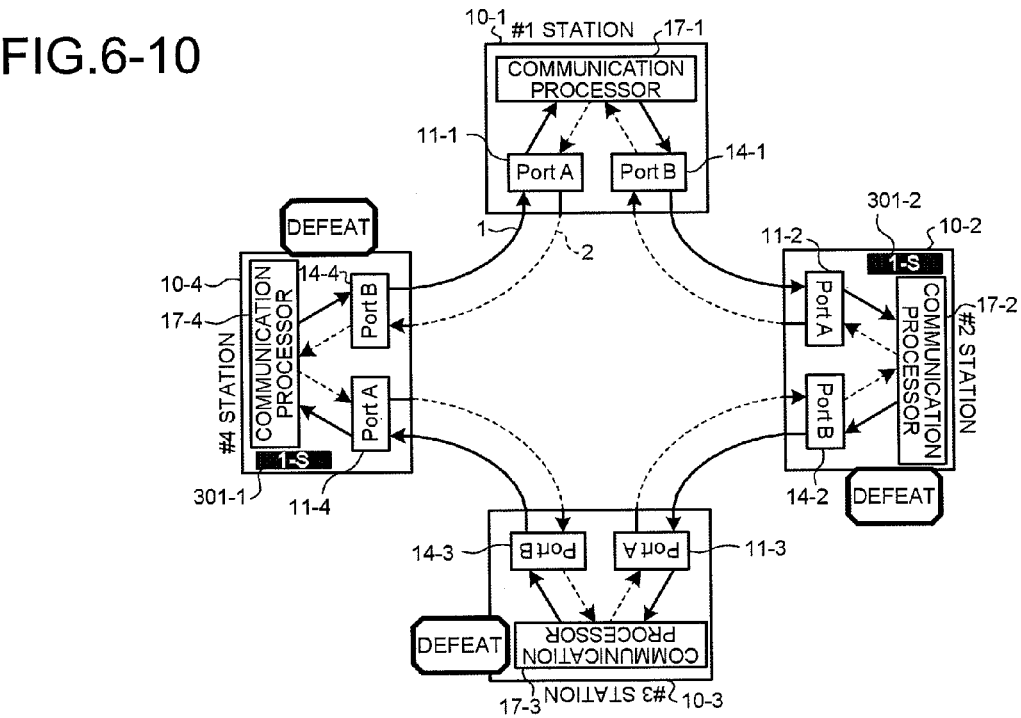
Figures 6, 7, 8, 9, 10, 11:
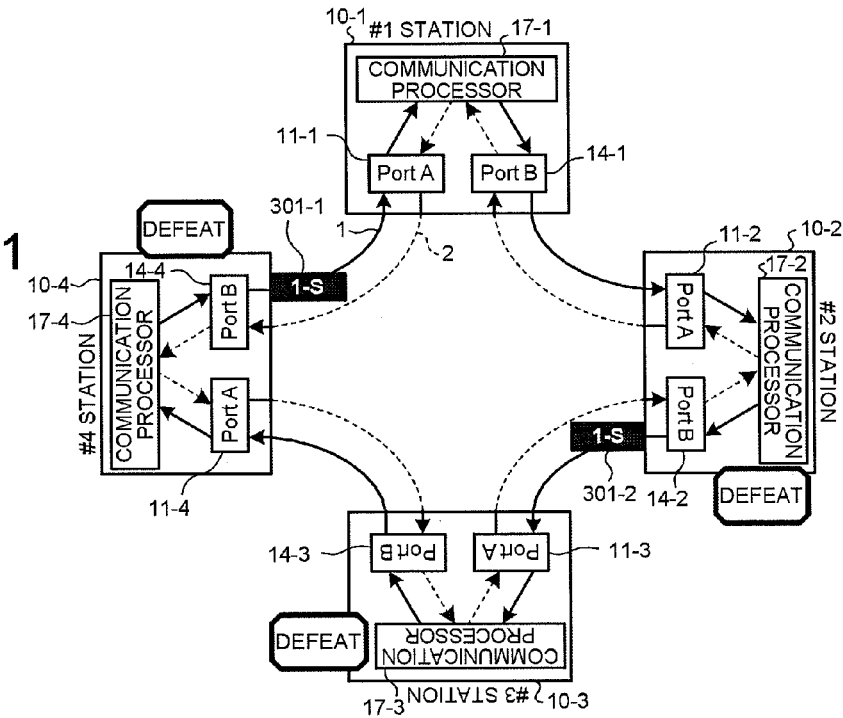
Figures 6, 7, 8, 9, 10, 11, 12:
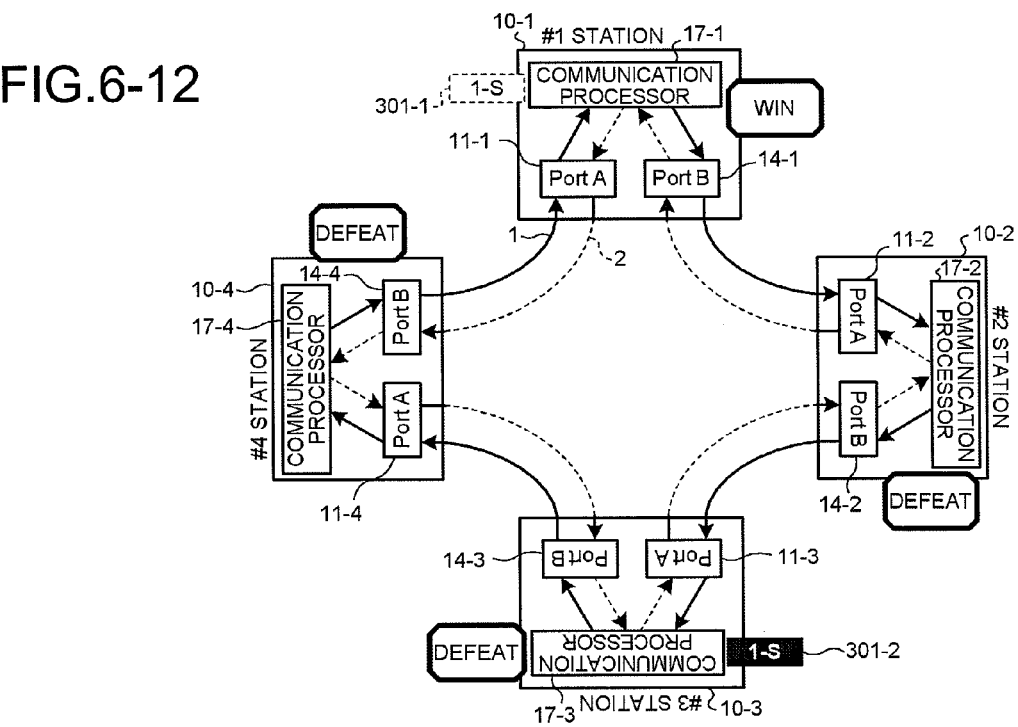
Figures 6, 7, 8, 9, 10, 11, 12, 13:
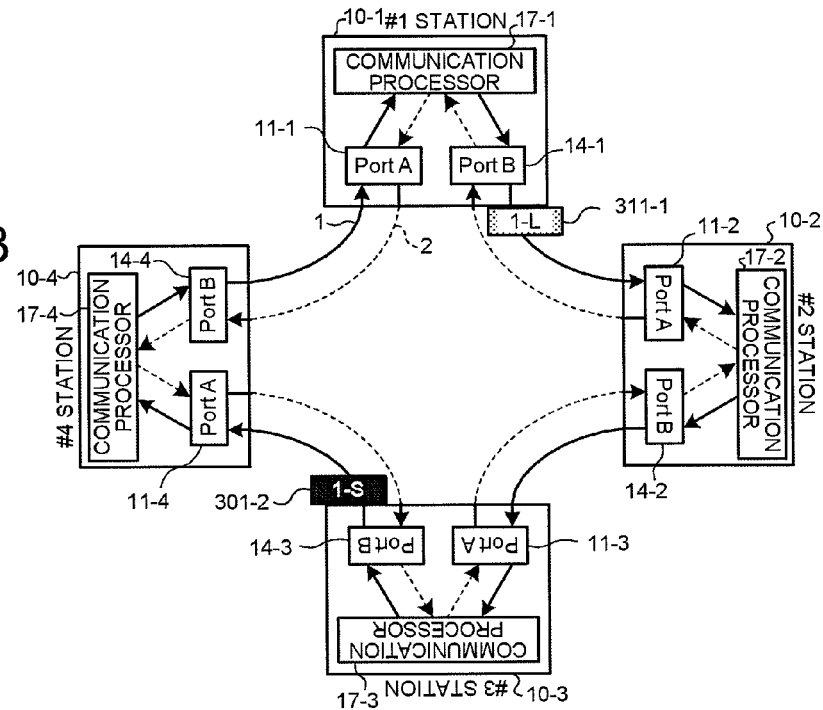
Figures 6, 7, 8, 9, 10, 11, 12, 13, 14:
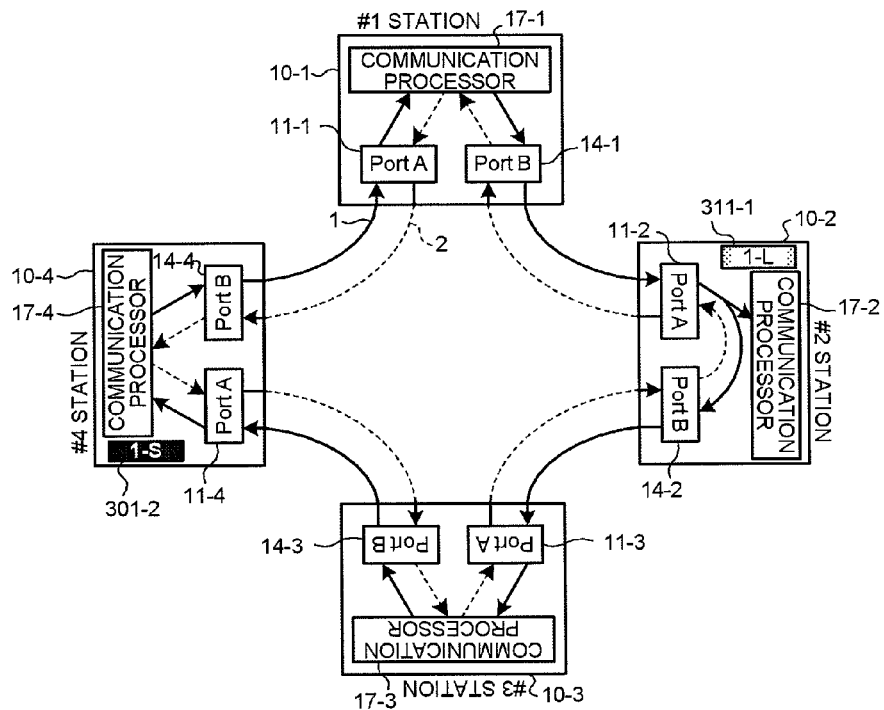
Figures 6, 7, 8, 9, 10, 11, 12, 13, 14, 15:
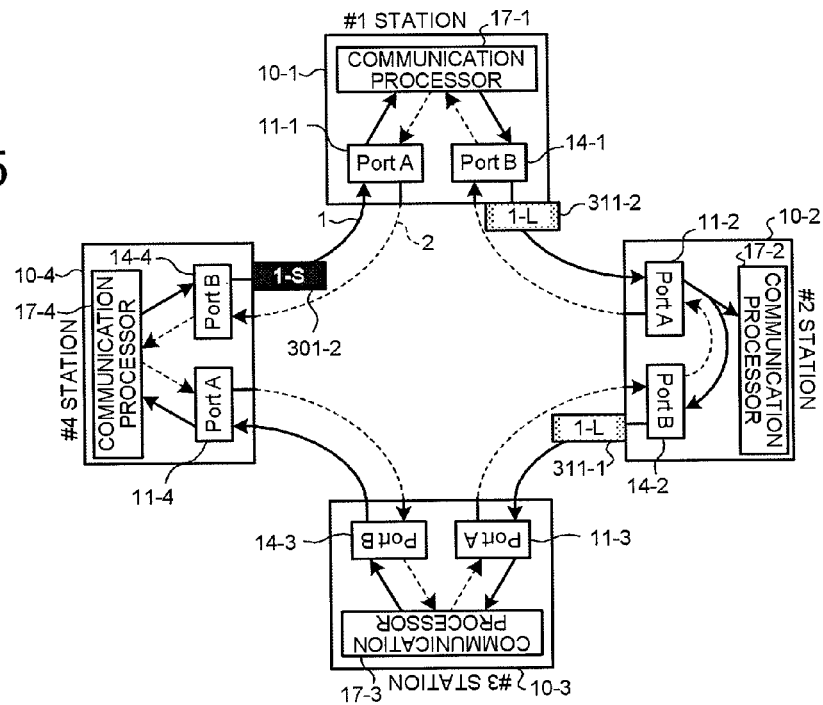
Figures 6, 7, 8, 9, 10, 11, 12, 13, 14, 15, 16:
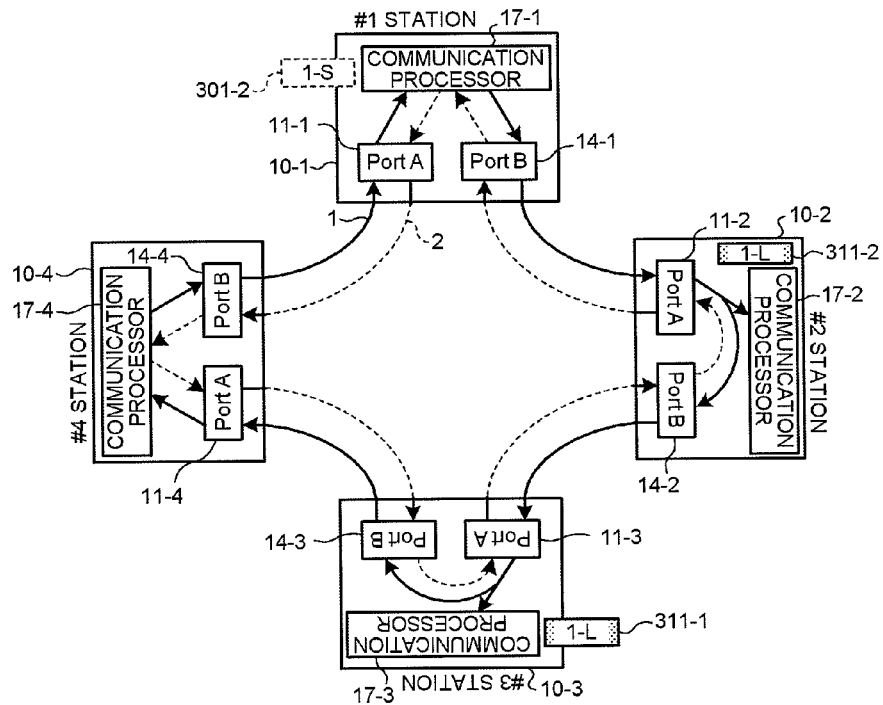
Figures 6, 7, 8, 9, 10, 11, 12, 13, 14, 15, 16, 17:
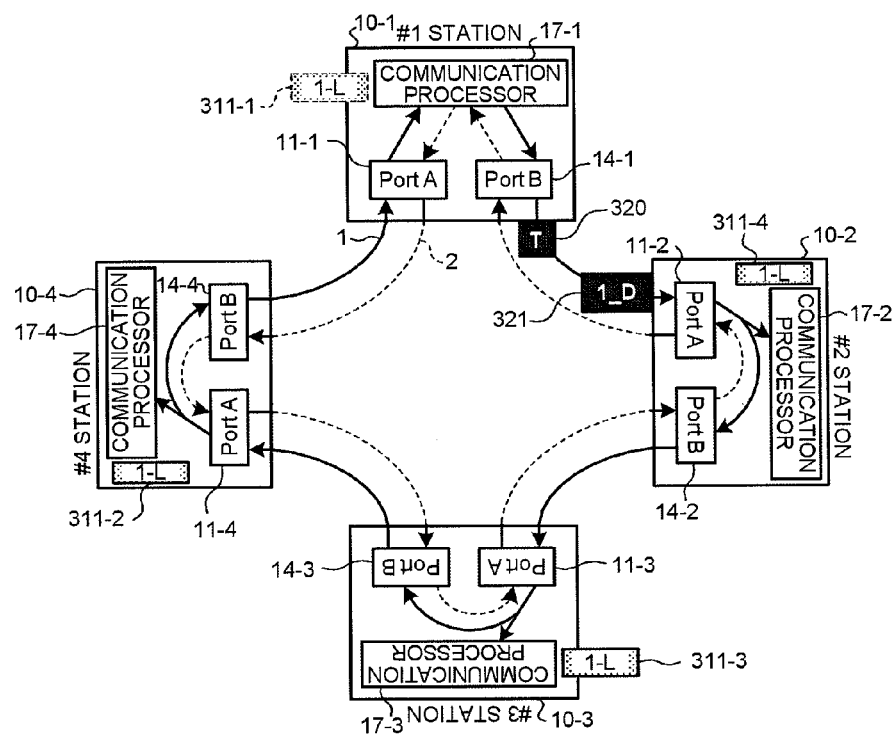
Figure 7:
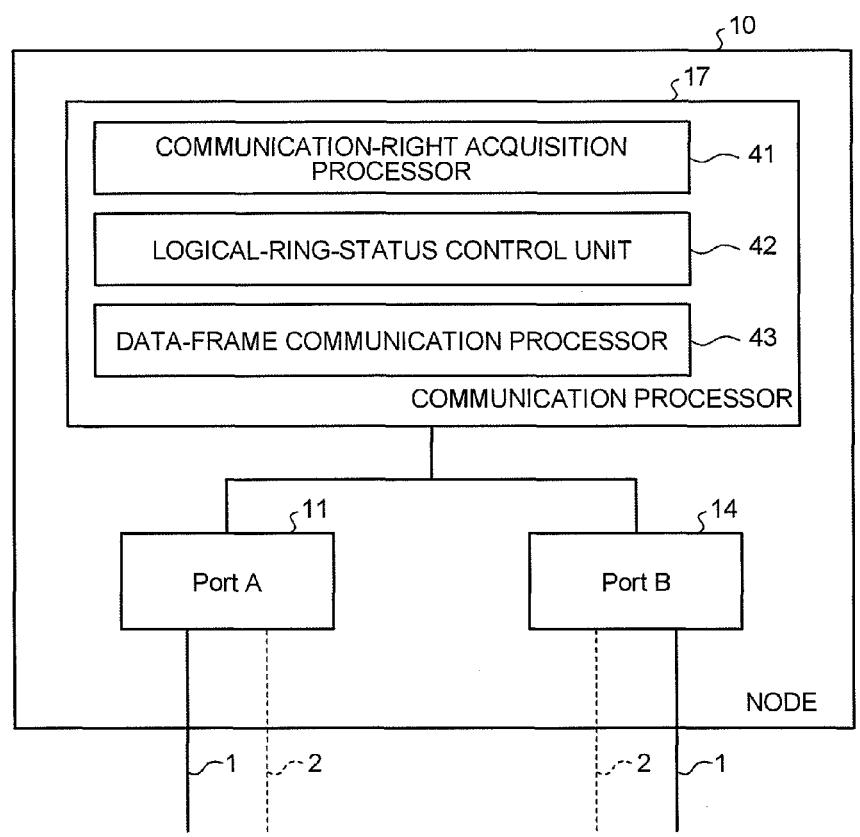
Figures 1, 8:
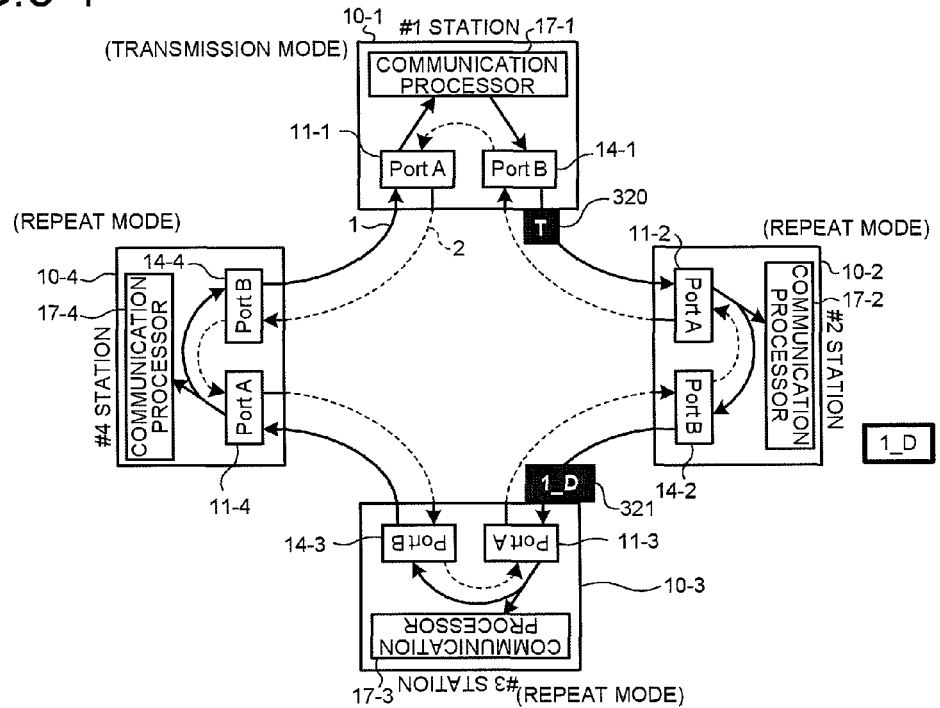
Figures 2, 8:
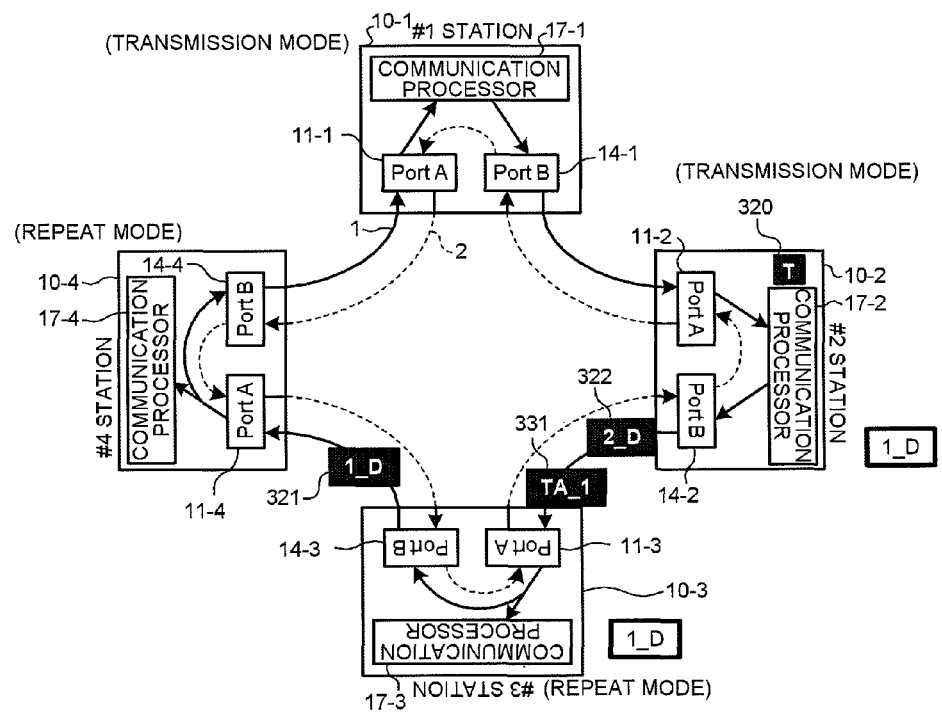
Figures 3, 8:
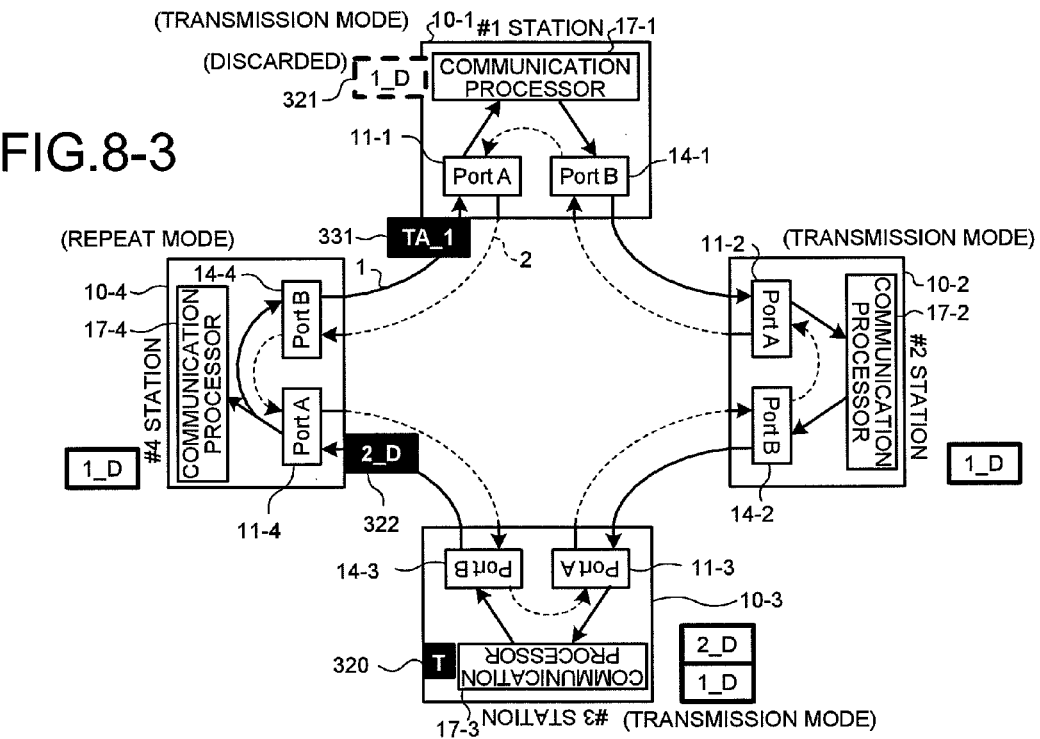
Figures 4, 8:
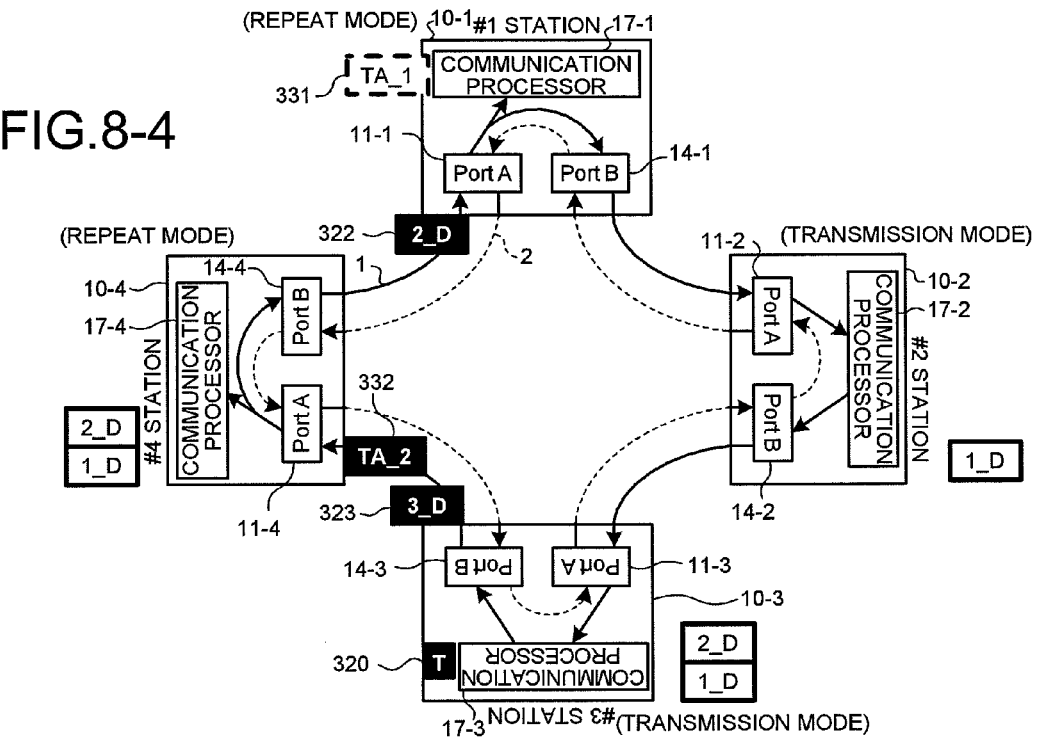
Figures 5, 8:
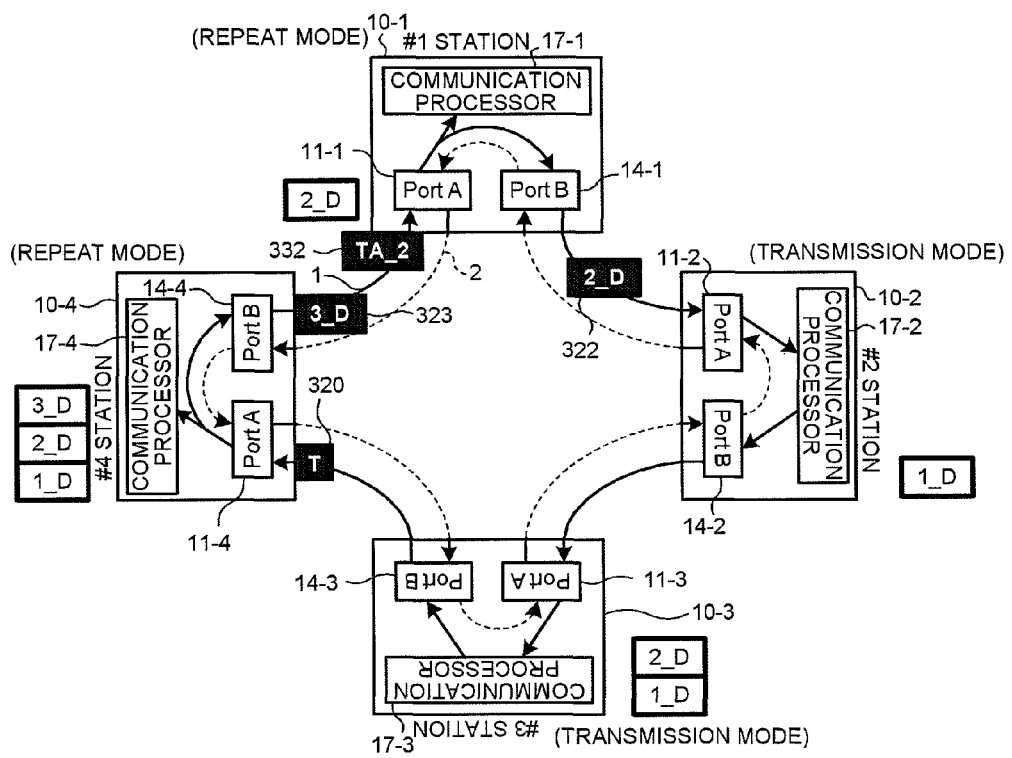
Figures 1, 9:
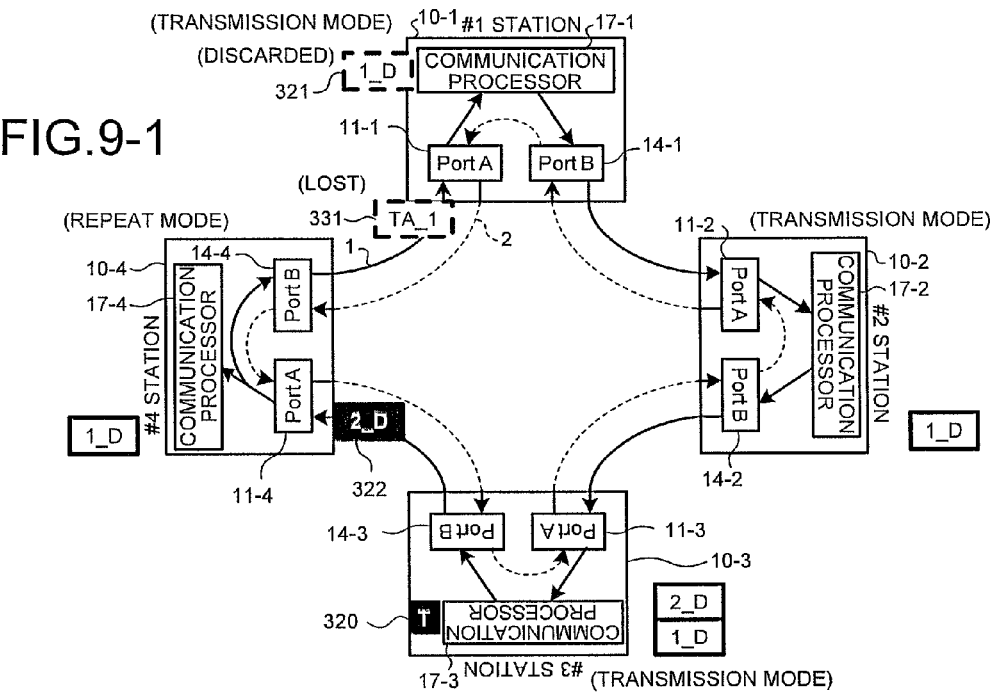
Figures 2, 9:
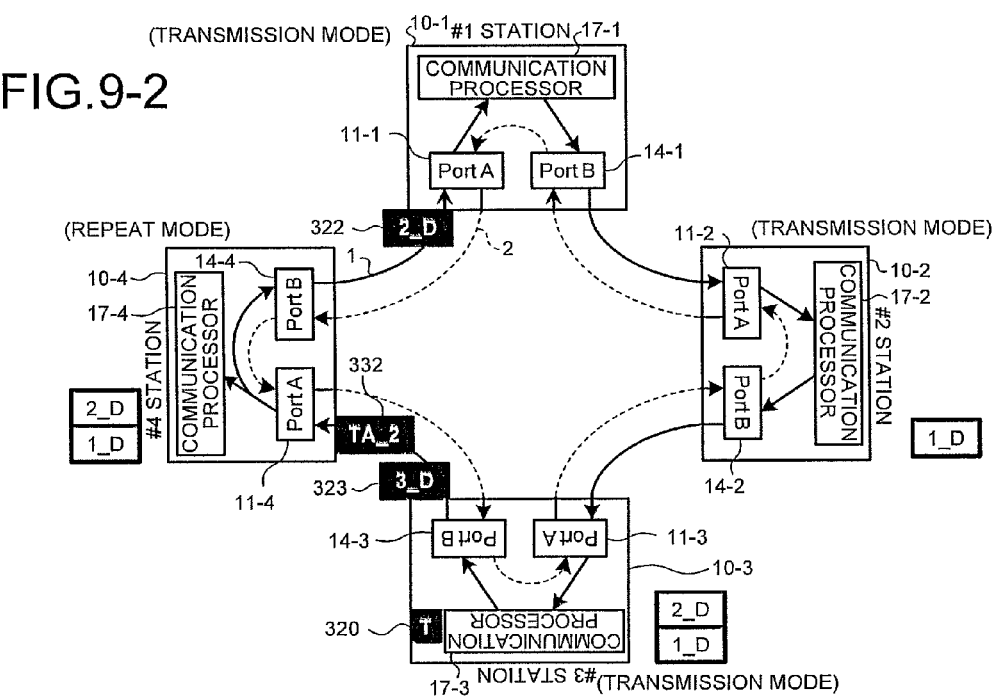
Figures 3, 9:
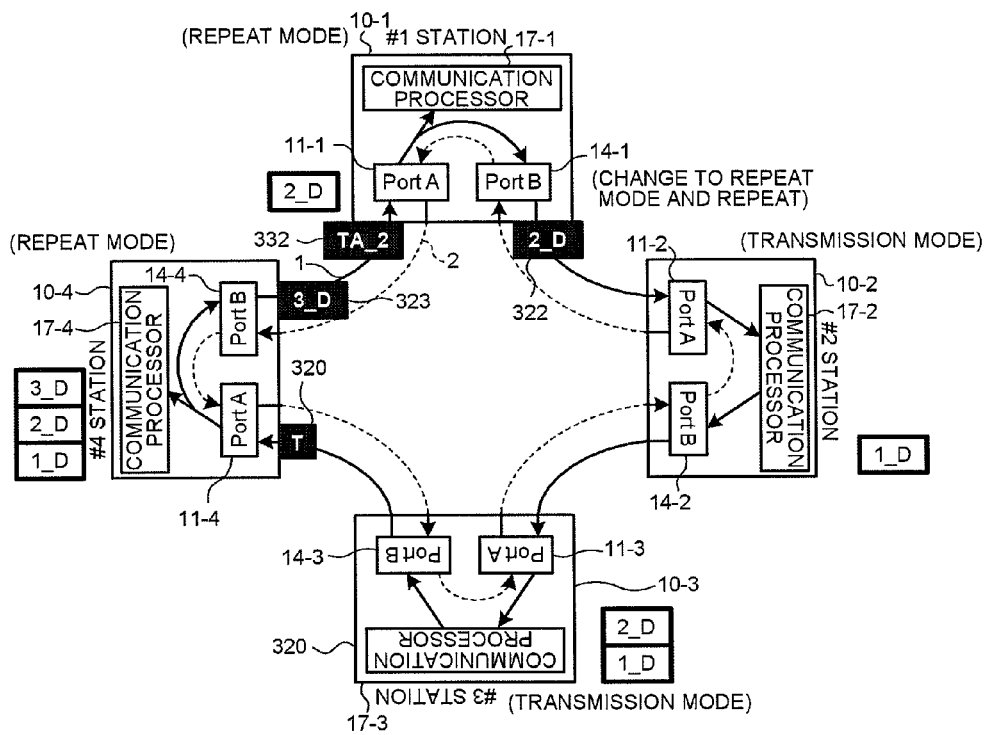
Figures 1, 10:
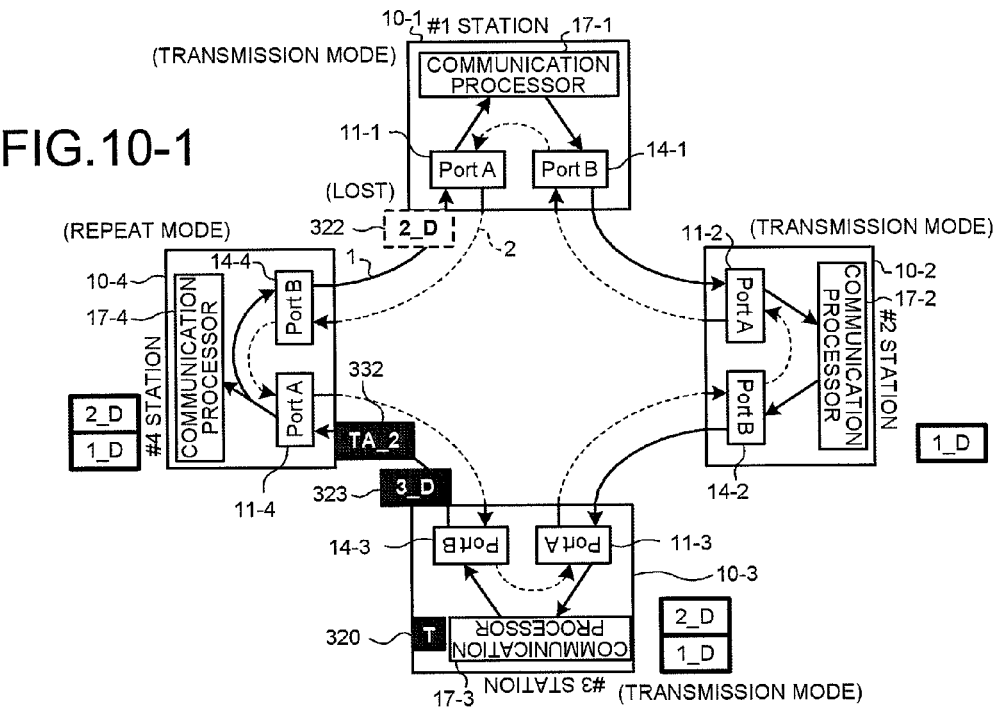
Figures 2, 10:
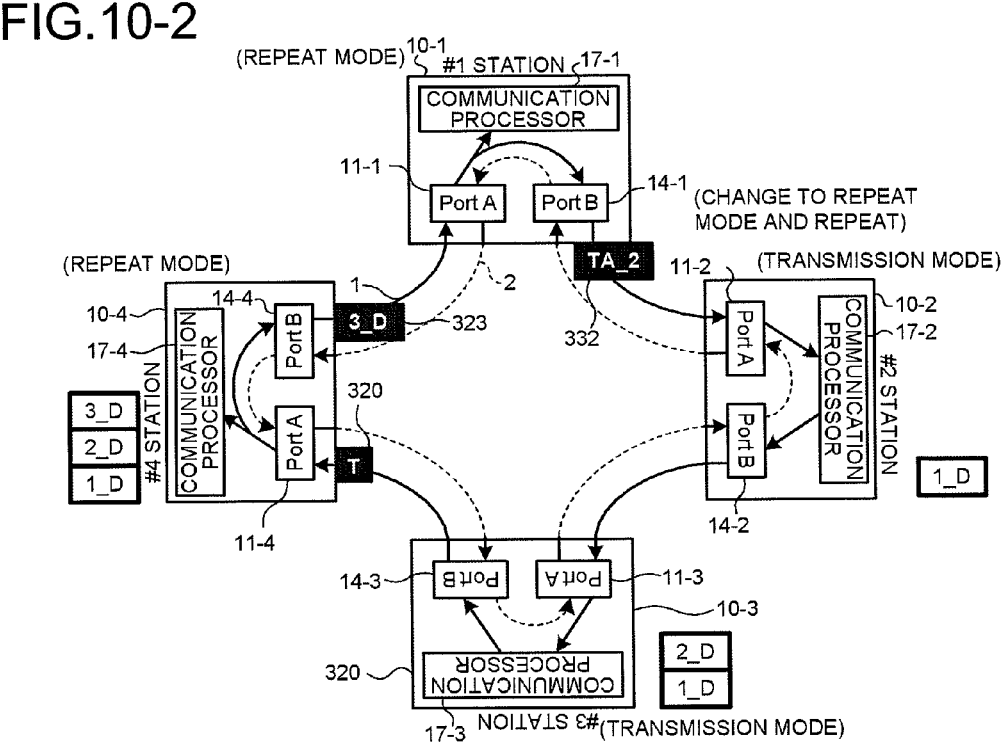
Figures 1, 11:
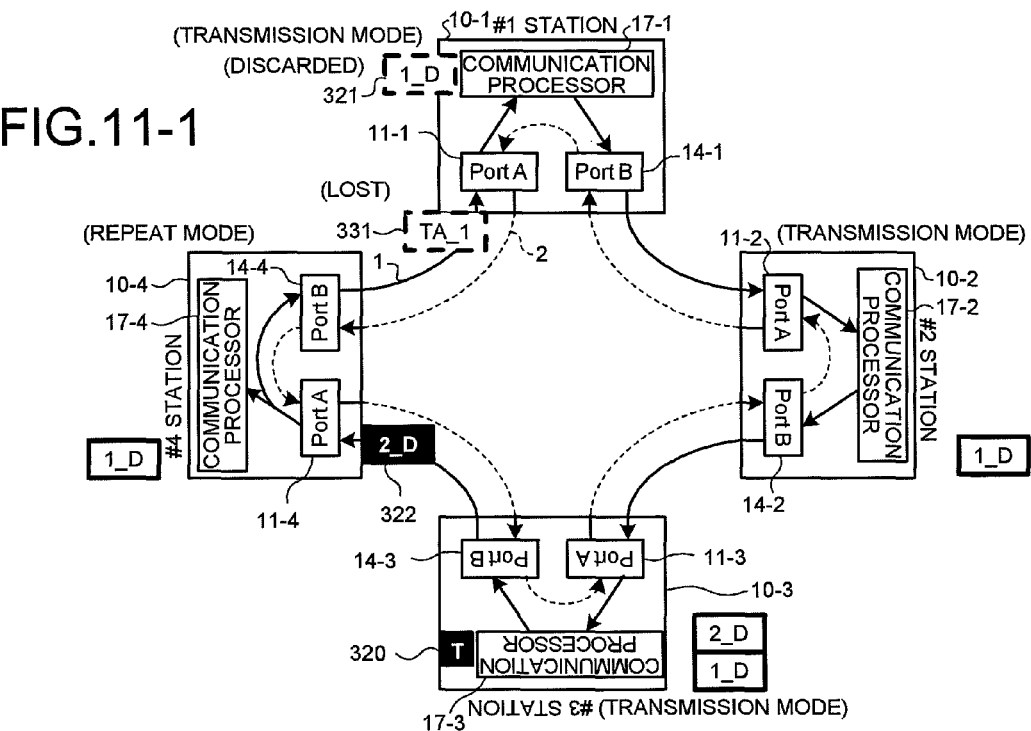
Figures 2, 11:
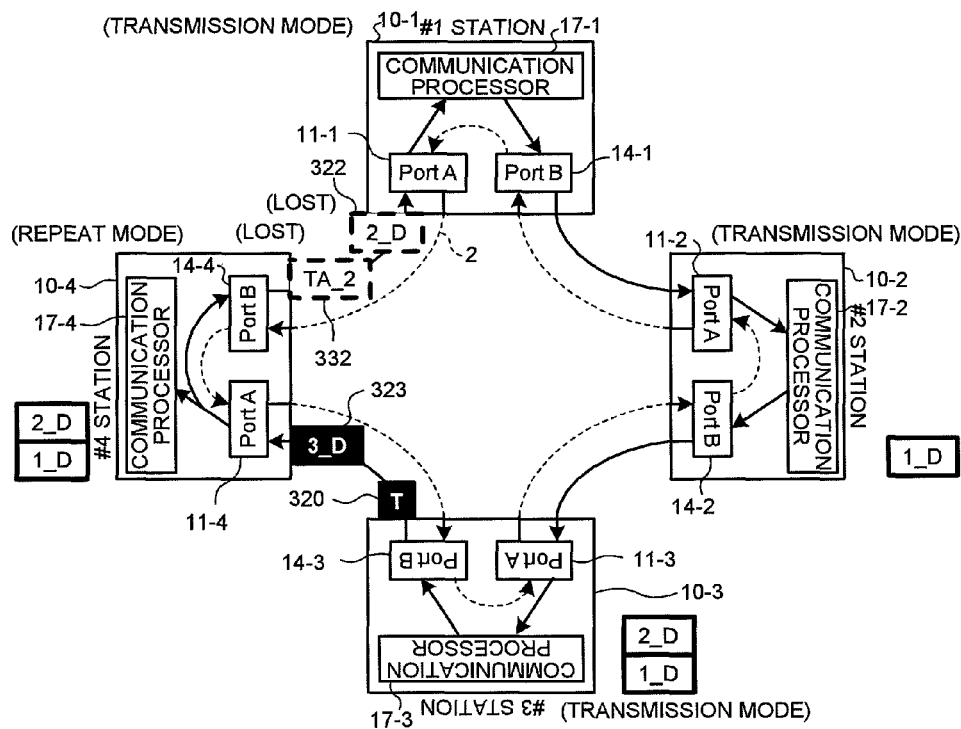
Figures 3, 11:
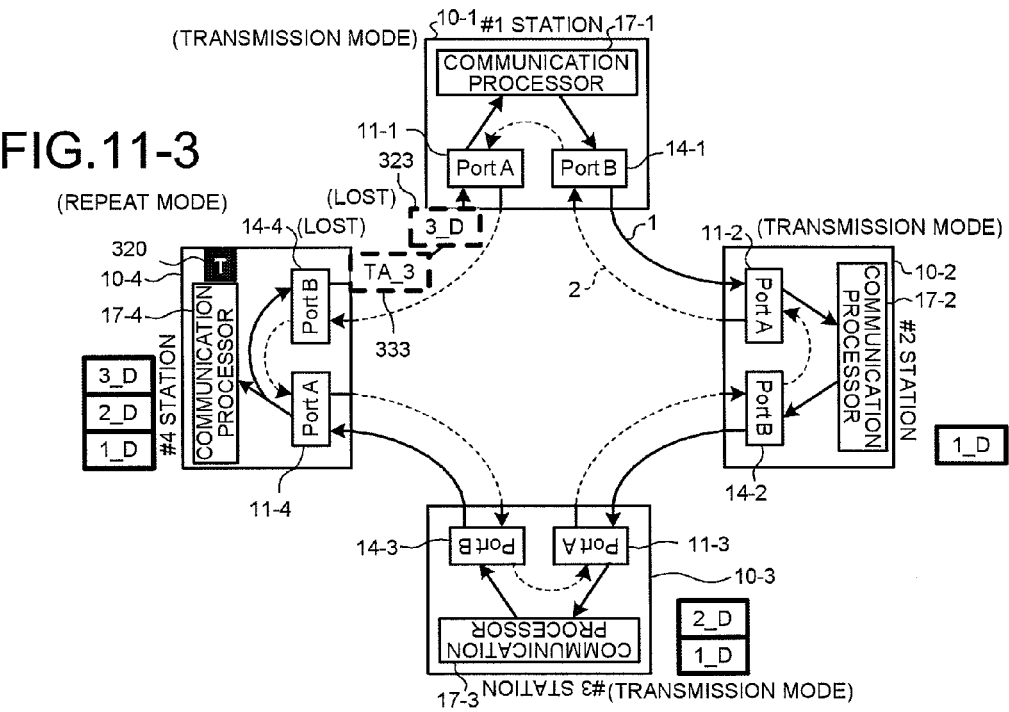
Figures 4, 11:
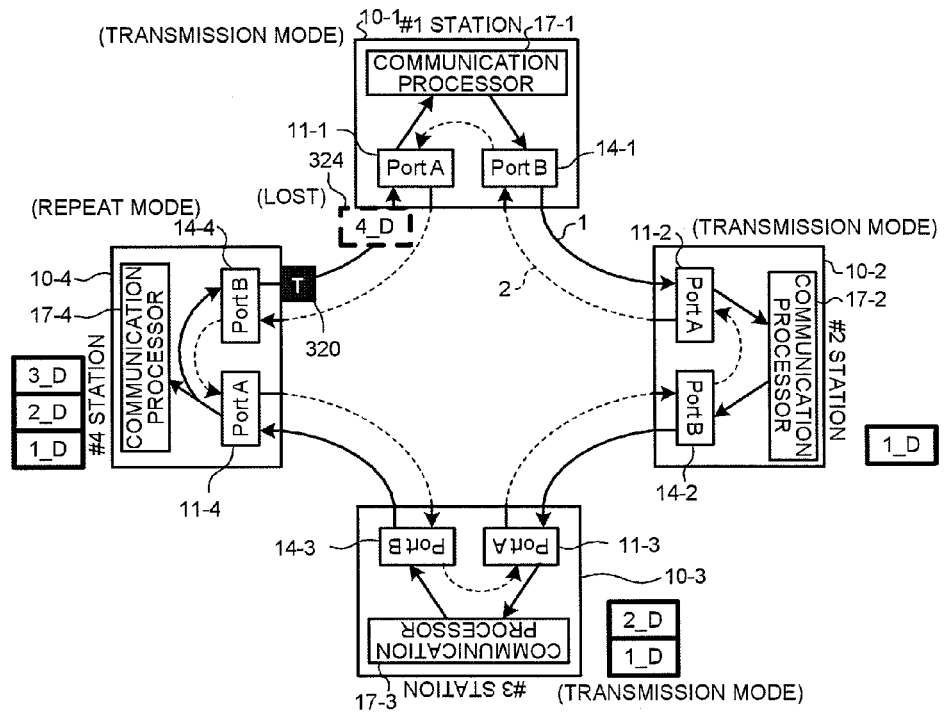
Figures 5, 11:
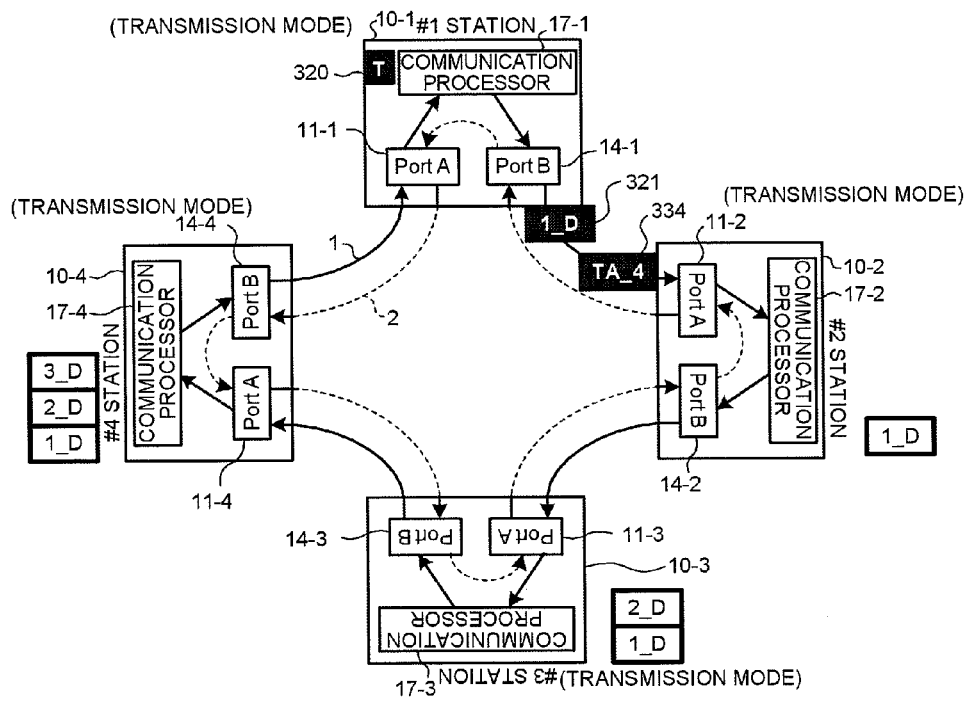
Figure 12:
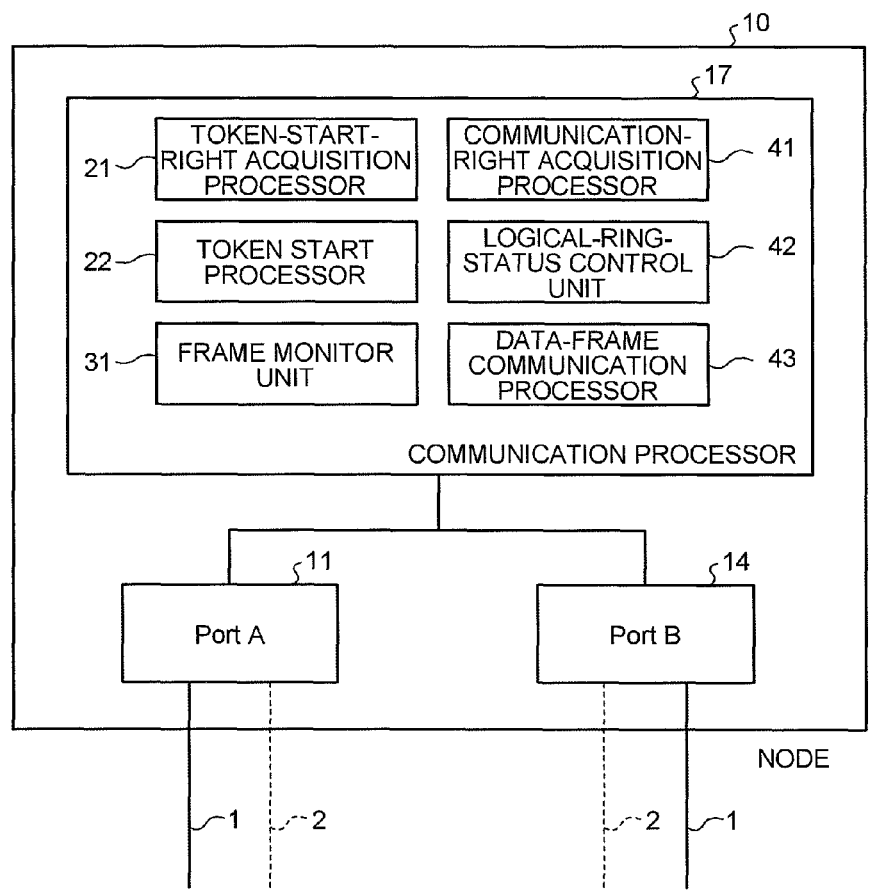
Figures 1, 13:
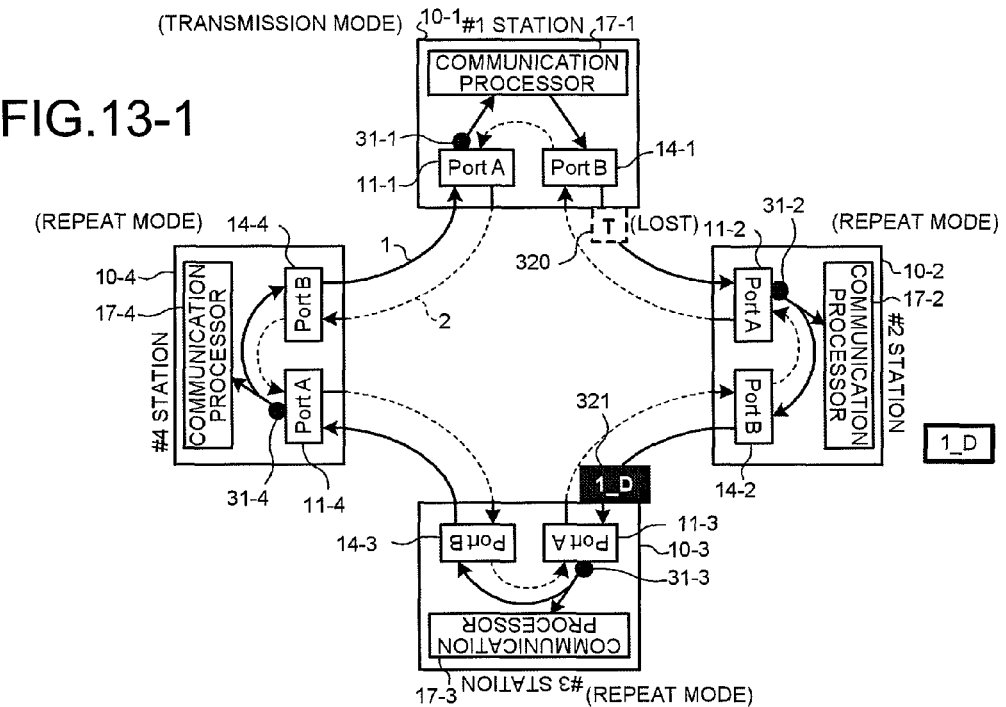
Figures 2, 13:
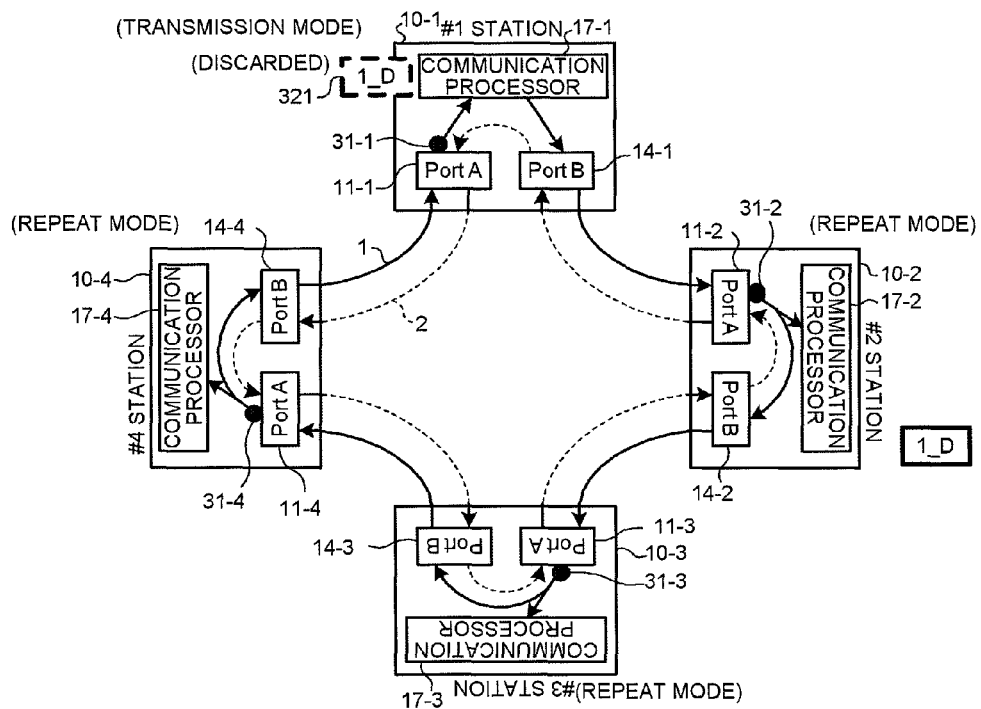
Figures 3, 13:
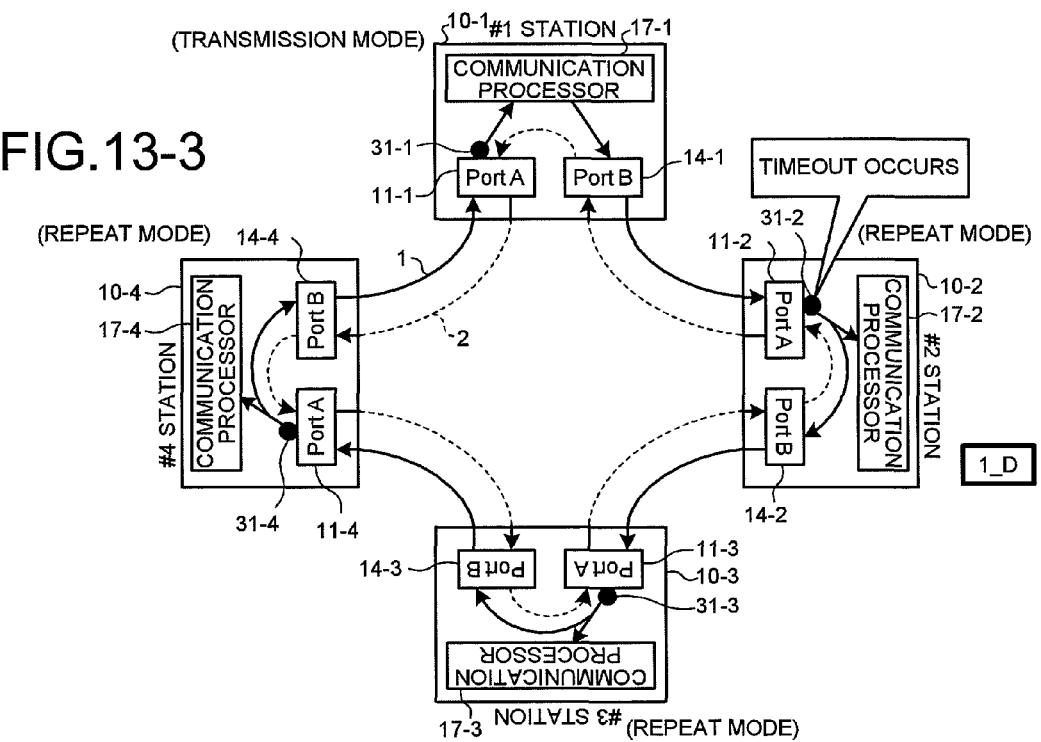
Figures 4, 13:
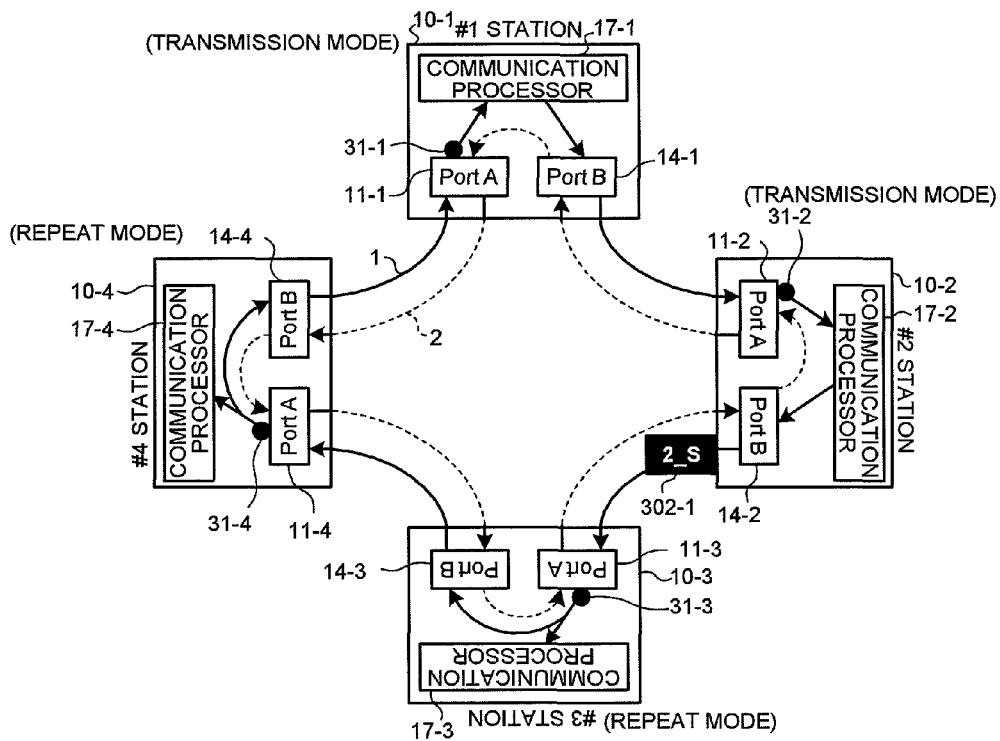

FIG. 13-1 to FIG. 13-4 are diagrams schematically showing an example of a reproduction processing procedure of a token frame due to loss of a token frame. It is noted that black circles added to the A ports 11-1 to 11-4 in these figures represent frame monitor units 31-1 to 31-4 provided in the communication processors 17-1 to 17-4, respectively. First, the #1 station 10-1 takes a token frame 320 and transmits a data frame 321, and then releases the token frame 320. Thereafter, it is assumed that the token frame 320 is lost on the ring between the #1 station 10-1 and the #2 station 10-2 caused by any undefined factor (FIG. 13-1). At this time, only the #1 station 10-1 that sends out the data frame 321 is in the transmission mode, and the #2 station 10-2 to the #4 station 10-4 are in the repeat mode.

When the data frame 321 issued by the #1 station 10-1 circulates and again returns to the #1 station 10-1 to be received thereby, the #1 station 10-1 discards the received data frame 321 because it is in the transmission mode (FIG. 13-2). A frame monitor unit 31-2 of the #2 station 10-2 detects that no frame is received more than a predetermined time after the data frame 321 is received and forwarded the last time (the frames do not pass around the ring) (FIG. 13-3). Namely, the frame monitor unit 31-2 detects that the token frame 320 is lost. Consequently, the token-start-right acquisition processor 21 of the communication processor 17-2 in the #2 station 10-2 performs the process of acquiring the token start right as explained in the second embodiment, and starts the process of regenerating the token frame 320 (FIG. 13-4). This figure shows a state in which the #2 station 10-2 sends out the token-start-right acquisition frame 302-1 at a predetermined time interval.

In FIG. 13-3, the reason why the #2 station 10-2 first detects the loss of the token frame 320 is because the #2 station 10-2 is the nearest to a location where the token frame 320 is lost, among the communication nodes which are located in the downstream side of the location where the token frame 320 is lost. In this case, it is assumed that a time (timer value) used to determine the loss of the token frame 320 is constant in all the communication nodes 10-1 to 10-4 on the ring.

According to the seventh embodiment, even when the token frame is lost during communication using the token passing system, the loss can be detected, and thus the token frame can quickly be regenerated. As a result, the seventh embodiment has an effect that the token frame can be automatically recovered from its loss.

Industrial Applicability

As explained above, the Ethernet (registered trademark)-base ring communication system according to the present invention is useful for a network formed of a plurality of communication nodes.

The invention claimed is:

1. A communication node in a communication system in which a plurality of communication nodes are connected by Ethernet in a ring shape, the communication node comprising:
   a data-frame communication processor that transmits/receives a data frame;
   a communication-right acquisition processor that, when receiving a token frame and acquiring a communication right, transmits a token-receipt completion notification frame addressed to a source communication node of the token frame, causes the data-frame communication processor to start transmitting the data frame, and releases the token frame when the data frame transmission by the data-frame communication processor is finished;
   a logical-ring-status control unit that switches between a transmission mode of disconnecting a logical connection within the own communication node upon acquisition of the communication right, and a repeat mode of finishing the disconnection of the logical connection within the own communication node upon reception of a token-receipt completion notification frame addressed to the own communication node;
   wherein the logical-ring-status control unit includes a function of switching the status of the own communication node to the repeat mode upon reception of a data frame issued and transmitted by another communication node without receiving the token-receipt completion notification frame addressed to the own communication node, and
   upon reception of the token frame without receiving the data frame issued and transmitted by the another communication node in the transmission mode or the token-receipt completion notification frame addressed to the own communication node, the communication-right acquisition processor again transmits the data frame, which has been transmitted by the own communication node before receiving the token frame transmitted by the another communication node, and thereafter releases the token frame, and
   the data-frame communication processor discards all received frames when the communication node is in the transmission mode, and forwards a received frame when the communication node is in the repeat mode.

2. The communication node according to claim 1, wherein the data-frame communication processor forwards a frame received after the data frame transmitted by the other communication node is received.

3. A token-ring communication method in a communication system in which a plurality of communication nodes are connected by Ethernet in a ring shape and communication is performed using a token passing system, the token-ring communication method comprising:
   a communication-right acquisition step of receiving a token frame to acquire a communication right, issuing and transmitting a token-receipt completion notification frame addressed to a source communication node of the token frame and transmitting a data frame to a communication node of a desired destination;
   a transmission-mode switch step of disconnecting a logical connection within the own communication node upon acquisition of the communication right, and switching the own communication node to a transmission mode;
   a token-frame release step of releasing the token frame when transmission of the data frame to be transmitted is finished; and
   a repeat-mode switch step of discarding all received frames before a data frame transmitted by another communication node is received, finishing the disconnection of the logical connection within the own communication node when a token-receipt completion notification frame addressed to the own communication node is received, switching the own communication node to a repeat mode, and forwarding a frame received after the switching,
   wherein the repeat-mode switch step includes a step of switching the status of the own communication node to the repeat mode upon reception of the data frame issued and transmitted by the another communication node without receiving the token-receipt completion notification frame addressed to the own communication node, and
   the repeat-mode switch step includes returning to the transmission-mode switch step without switching the own communication node to the repeat mode upon reception of the token frame without receiving the data frame issued and transmitted by the another communication node in the transmission mode or the token-receipt completion notification frame addressed to the own communication node, and the communication-right acquisition step includes transmitting again the data frame, which has been transmitted by the own communication node before receiving the token frame transmitted by the another communication node, and thereafter releases the token frame.

4. The token-ring communication method according to claim 3, wherein the repeat-mode switch step includes forwarding a frame received after the data frame transmitted by the other communication node is received.

* * * * *